(12) United States Patent
Royyuru et al.

(10) Patent No.: US 11,410,147 B2
(45) Date of Patent: Aug. 9, 2022

(54) SYSTEMS AND METHODS FOR FACILITATING PURCHASES AT A GAS STATION

(71) Applicant: First Data Corporation, Greenwood Village, CO (US)

(72) Inventors: Vijay K. Royyuru, Norristown, PA (US); Brad Lucas, Montara, CA (US); Jack Stephenson, San Francisco, CA (US); S. Shane Caldwell, III, Coral Springs, FL (US); Scott Mackay, Roswell, GA (US); Brent A. Stains, Chambersburg, PA (US); Dale McCrory, Atlanta, GA (US); Mark A. Petersen, Council Bluffs, IA (US); Raja Vel, Omaha, NE (US)

(73) Assignee: FIRST DATA CORPORATION, Brookfield, WI (US)

( * ) Notice: Subject to any disclaimer, the term of this patent is extended or adjusted under 35 U.S.C. 154(b) by 226 days.

(21) Appl. No.: 16/803,766

(22) Filed: Feb. 27, 2020

(65) Prior Publication Data
US 2020/0202320 A1    Jun. 25, 2020

Related U.S. Application Data

(62) Division of application No. 14/855,679, filed on Sep. 16, 2015, now abandoned.

(51) Int. Cl.
*G06Q 20/18* (2012.01)
*G06Q 30/06* (2012.01)
(Continued)

(52) U.S. Cl.
CPC .......... *G06Q 20/18* (2013.01); *G06Q 20/047* (2020.05); *G06Q 20/102* (2013.01);
(Continued)

(58) Field of Classification Search
None
See application file for complete search history.

(56) References Cited

U.S. PATENT DOCUMENTS 9,858,565 B1 * 1/2018 Zettner .............. G06Q 20/3224
10,043,176 B2 * 8/2018 Gulchenko .......... G06Q 20/327
(Continued)

FOREIGN PATENT DOCUMENTS

WO    2008/149101 A2    12/2008
WO    2017/048527 A1    3/2017

OTHER PUBLICATIONS

International Preliminary Report on Patentability dated Mar. 29, 2018 for PCT/US2016/049967; all pages.
(Continued)

*Primary Examiner* — Scott A Zare
(74) *Attorney, Agent, or Firm* — Foley & Lardner LLP

(57) ABSTRACT

A method of remotely activating a transaction device includes receiving, at a computing system, a mobile device identifier from a mobile application executed on a mobile device. A selection of the transaction device is received from the application. The selection includes an identifier of the transaction device. A selection of a transaction amount related to purchase of a product is received from the application. An authorization request for a payment account associated with the mobile device is communicated to an issuer of the payment account. The authorization request is for a transaction of at least the transaction amount. An authorization approval for the transaction is received from the issuer and a signal to activate the transaction device to dispense the product is sent based on the identifier. The transaction device is deactivated upon dispensing the transaction amount and a receipt of the transaction is provided to the mobile device.

24 Claims, 14 Drawing Sheets

(51) Int. Cl.

| | |
|---|---|
| *G06Q 20/40* | (2012.01) |
| *G06Q 20/10* | (2012.01) |
| *G06Q 20/32* | (2012.01) |
| *G06Q 20/20* | (2012.01) |
| *G06Q 20/04* | (2012.01) |
| *H04W 12/06* | (2021.01) |
| *G07F 13/02* | (2006.01) |
| *H04W 12/084* | (2021.01) |
| *H04L 9/40* | (2022.01) |

(52) U.S. Cl.
 CPC ......... *G06Q 20/202* (2013.01); *G06Q 20/204* (2013.01); *G06Q 20/3223* (2013.01); *G06Q 20/3224* (2013.01); *G06Q 20/4015* (2020.05); *G06Q 20/4016* (2013.01); *G06Q 30/0635* (2013.01); *G07F 13/025* (2013.01); *H04L 63/0853* (2013.01); *H04W 12/06* (2013.01); *H04W 12/084* (2021.01)

(56) References Cited

U.S. PATENT DOCUMENTS

| | | | |
|---|---|---|---|
| 2006/0121981 | A1 | 6/2006 | Pfennighausen et al. |
| 2007/0108269 | A1 | 5/2007 | Benco et al. |
| 2008/0005037 | A1 | 1/2008 | Hammad et al. |
| 2008/0319904 | A1 | 12/2008 | Carlson et al. |
| 2011/0225057 | A1 | 9/2011 | Webb et al. |
| 2012/0277904 | A1 | 11/2012 | Pritchard et al. |
| 2013/0030931 | A1* | 1/2013 | Moshfeghi ............ G01S 5/0009 705/16 |
| 2013/0097031 | A1 | 4/2013 | Royyuru et al. |
| 2013/0246171 | A1 | 9/2013 | Carapelli |
| 2014/0006188 | A1 | 1/2014 | Grigg et al. |
| 2014/0074605 | A1 | 3/2014 | Sanchez et al. |
| 2014/0136407 | A1 | 5/2014 | Hazam et al. |
| 2014/0157381 | A1 | 6/2014 | Disraeli |
| 2014/0279111 | A1* | 9/2014 | Mahaffey ........... G06Q 20/3278 705/21 |
| 2015/0088746 | A1 | 3/2015 | Hoffman |
| 2015/0106196 | A1 | 4/2015 | Williams et al. |
| 2015/0242969 | A1 | 8/2015 | Pallas et al. |
| 2016/0221818 | A1* | 8/2016 | Gotz ..................... G06Q 50/06 |
| 2017/0076265 | A1 | 3/2017 | Royyuru et al. |
| 2017/0076306 | A1* | 3/2017 | Snider .................. H04W 4/029 |

OTHER PUBLICATIONS

International Search Report and Written Opinion dated Jan. 12, 2017 for International Patent Application No. PCT/US2016/049967; all pages.

Extended Search Report and Written Opinion dated Jun. 21, 2019 in related foreign application EP16847059.9, all pgs.

Non-Final Office Action dated Mar. 9, 2018 in related U.S. Appl. No. 14/855,679, all pgs.

Final Office Action dated Sep. 10, 2018 in related U.S. Appl. No. 14/855,679, all pgs.

Advisory Action dated Nov. 28, 2018 in related U.S. Appl. No. 14/855,679, all pgs.

Non-Final Office Action dated Feb. 26, 2019 in related U.S. Appl. No. 14/855,679, all pgs.

Final Office Action dated Jul. 12, 2019 in related U.S. Appl. No. 14/855,679, all pgs.

Advisory Action dated Sep. 27, 2019 in related U.S. Appl. No. 14/855,679, all pgs.

Non-Final Office Action dated Oct. 31, 2019 in related U.S. Appl. No. 14/855,679, all pgs.

* cited by examiner

SYSTEMS AND METHODS FOR FACILITATING PURCHASES AT A GAS STATION

CROSS REFERENCES TO RELATED APPLICATIONS

This application is a divisional of U.S. patent application Ser. No. 14/855,679, filed Sep. 16, 2015, entitled "SYSTEMS AND METHODS FOR FACILITATING PURCHASES AT A GAS STATION," the entire disclosure of which is incorporated herein by reference for all purposes.

BACKGROUND OF THE INVENTION

Mobile transactions, such as those performed by mobile applications, are becoming more commonplace. However, these systems typically only allow users to provide electronic payment information to a merchant, without allowing for the selection of goods to be provided from an automated system, such as a fuel pump or vending machine. Additionally, mobile transactions can be difficult to authenticate as there is no need for a physical payment media, only a mobile device. Improvements in mobile transaction security are desired.

BRIEF SUMMARY OF THE INVENTION

The present disclosure is directed to systems and methods facilitating purchases at a gas station or other merchant, as well as providing mobile application payment sharing solutions. Additionally, authentication techniques are provided that may be particularly useful in verifying a user's identity when conducting mobile transactions.

In one aspect, a method of remotely activating a transaction device using a mobile device is provided. The method may include receiving, at a computing system, a mobile device identifier from a mobile application executed on a mobile device within a detection range of a transaction device. The mobile device identifier may be associated with the mobile device. The method may also include receiving a selection of the transaction device from the mobile application. The selection may include an identifier associated with the transaction device. The method may further include receiving from the mobile application a selection of a transaction amount related to purchase of a product. The method may include communicating an authorization request for a payment account associated with the mobile device to an issuer of the payment account. The authorization request may be for a transaction of at least the transaction amount. The method may also include receiving an authorization approval for the transaction from the issuer and sending a signal to activate the transaction device to dispense the product. The signal may be transmitted based on the identifier associated with the transaction device. The method may further include deactivating the transaction device upon dispensing the transaction amount and providing a receipt of the transaction to the mobile device.

In another aspect, a method of remotely activating a transaction device using a mobile application executed on a mobile device is provided. The method may include determining that the mobile device is within a detection range of a transaction device and providing a mobile device identifier associated with the mobile device to a computing device. The method may also include providing a selection of the transaction device to the computing device. The selection may include an identifier associated with the transaction device. The method may further include receiving, on a user interface of the mobile application, a selection of a transaction amount related to a purchase of a product. The method may include providing an authorization request for the transaction amount to the computing device such that upon authorization of the transaction amount the transaction device is activatable by the computing device to dispense the product. The method may also include receiving a receipt of the purchase upon the product being dispensed.

In another aspect, a method of enrolling a mobile device for use in mobile transactions is provided. The method may include receiving, at a computing device, an input from a point of sale device of a merchant. The input may include a payment information associated with a payment media and originating from an interaction of the payment media with a payment reader of the point of sale device during a purchase transaction. The method may also include storing the payment information and receiving a mobile device identifier from the point of sale device. The method may further include sending a communication to a mobile device associated with the mobile device identifier. The communication may provide access to a download for a mobile application associated with the merchant. The method may include associating the mobile device identifier with the payment information and receiving authentication credentials from the mobile application being executed on the mobile device. The authentication credentials may include a user identifier and password. The method may further include creating a user account associated with the mobile device identifier, the payment information, and the authentication credentials.

In another aspect, a method of setting up shared payment account for conducting mobile transactions is provided. The method may include receiving payment information from a first mobile application executed on a first mobile device. The payment information may be associated with a payment account of a verified user. The method may also include receiving, from the first mobile application, a selection of a second user to be added as an authorized user of the payment account. The second user may have a user identifier. The method may further include providing a notification to the second user that the second user has been added by the verified user as an authorized user of the payment account. The notification may be directed to the second user using the user identifier. The method may include receiving a confirmation message from a second mobile application executed on a second mobile device of the second user. The confirmation message may include authentication information associated with the second user. The method may also include adding the second user as an authorized user of the payment account.

In another aspect, a method for requesting funds from another user is provided. The method may include receiving a request for a payment from a first mobile application executed by a first mobile device. The request may include a transaction amount and a user identifier associated with a second user account and a second mobile device. The method may also include receiving a user authentication from the first mobile application to verify an identity of a user of the first mobile device. The method may also include communicating a message to the second mobile device using the user identifier. The message may include a request to provide funds for the transaction amount. The method may further include receiving an acceptance of the request to provide funds from a second mobile application being executed by the second mobile device. The method may include authorizing a payment account associated with the second user account for the payment such that the first mobile device may complete a related payment transaction in real-time. The method may further include providing a receipt of the payment transaction to the second mobile device.

In another aspect, a method of conducting mobile transactions using a mobile application is provided. The method may include receiving an odometer reading of a vehicle and interfacing with a telematics interface of the vehicle. The method may also include receiving a telematics input from the telematics interface. The telematics input may include a status of one or more systems of the vehicle. The method may further include setting one or more service notifications based on the odometer reading and the telematics input and presenting at least one of the one or more service notifications on a display of a mobile device executing the mobile application. The method may include receiving a request to schedule a service appointment related to the at least one of the one or more service notifications and receiving a schedule of available service times from a service provider. The method may also include providing a scheduling user interface that may include the schedule of available service times on the display of the mobile device. The method may further include receiving a selection of the service appointment comprising at least one of the available service times and communicating the selection to the service provider.

In another aspect, a method of fraud prevention and authentication is provided. The method may include receiving a request for a transaction and performing two or more authentication measures. The method may further include determining a result for each of the two or more authentication measures and computing a weighted score based on the results of the two or more authentication measures. The method may further include determining whether to authenticate the transaction based at least in part on the weighted score.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The present disclosure is directed to systems and methods facilitating purchases at a gas station or other merchant, as well as providing mobile application payment sharing solutions. Certain example embodiments of the disclosure will now be described more fully hereinafter with accompanying drawings and corresponding description in FIGS. 1-13.

This disclosure may, however, be embodied in many different forms and should not be construed as limited to the embodiments set forth herein.

Figure 1:
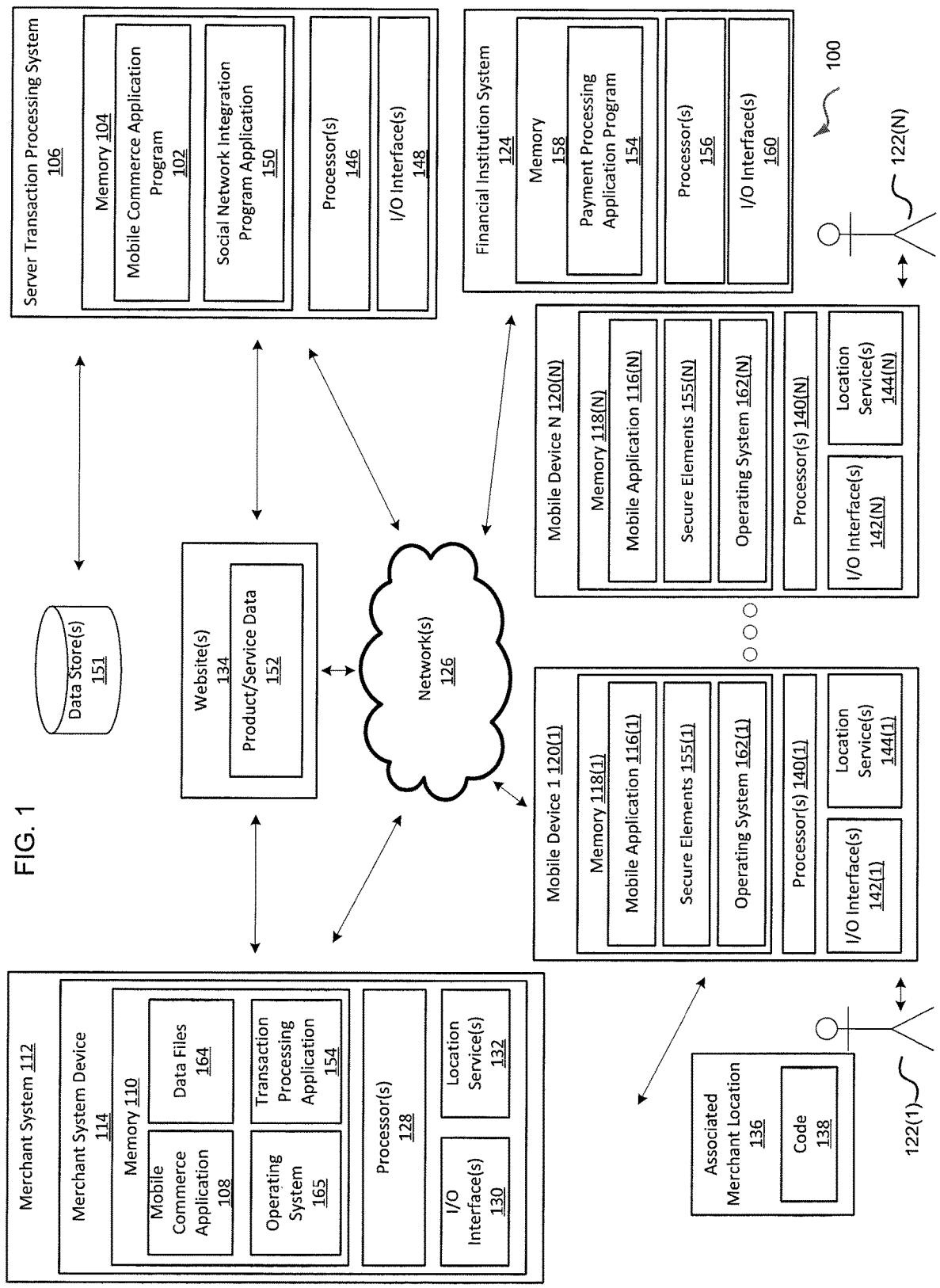
FIG. 1 is a system diagram showing a system for conducting mobile transactions according to embodiments.

An example architecture or environment for a system 100 according various example embodiments of the disclosure is shown in and described with respect to FIG. 1. A mobile commerce application program or module, such as 102, can be stored in memory 104 at a server device 106. In certain embodiments, a mobile commerce application program or module, such as 108, can be stored in memory 110 at a merchant system computer 112 or associated merchant device 114. In certain embodiments, a mobile commerce application program or module, such as 116(1), can be stored in memory 118(1) at a mobile device 120(1) associated with a consumer 122(1) or user. In any instance, one or more mobile commerce application programs or modules operating on respective computers, servers and/or mobile devices can implement some or all of the functionality described herein.

System 100 may include or otherwise support one or more merchant system computers 112 and/or associated merchant devices 114, one or more consumer or mobile devices 120(1)-120(N), one or more server transaction processing systems 106, and one or more issuer or financial institution systems 124. A wide variety of different types of consumer or mobile devices 120(1)-120(N) may be provided or otherwise supported, such as consumer computers and/or mobile communication devices. As desired, the system 100 may provide or otherwise support a wide variety of other entities associated with payment transactions, such as one or more server transaction processing systems 106. Any number of suitable networks and/or communication channels, such as the illustrated networks 126, may facilitate communication between various components of the system 100.

Any number of merchant system computers 112 and/or associated merchant devices 114 may be provided or otherwise supported. In certain example embodiments, these merchant system computers 112 and/or associated merchant devices 114 may include one or more point-of-sale (POS) devices, transaction devices, and/or terminals. As desired, each merchant system computer 112 and/or associated merchant device 114 may include any number of processor-driven devices, including but not limited to, a server computer, a mainframe computer, one or more networked computers, a desktop computer, a personal computer, a laptop computer, a mobile computer, a smartphone, a tablet computer, a wearable computer device, an application specific circuit, and/or any other processor-based device.

A merchant system computer 112 and/or associated merchant device 114 may be any suitable device that facilitates purchase transactions, such as those in retail establishments, e-commerce and/or mobile transactions. In operation, the merchant system computer 112 and/or associated merchant device 114 may utilize one or more processors 128 to execute computer readable instructions that facilitate the hosting of one or more mobile commerce application program services, the receipt of purchase transaction requests, and/or the processing of payment transactions. As a result of executing these computer-readable instructions, a special purpose computer or particular machine may be formed that facilitates the purchase transactions.

In addition to having one or more processors 128, the merchant system computer 112 and/or associated merchant device 114 may further include and/or be associated with one or more memory devices 110, input/output ("I/O") interface(s) 130, network interface(s), and/or location services 132. The memory 110 may be any computer-readable medium, coupled to the processor(s) 128, such as random access memory ("RAM"), read-only memory ("ROM"), and/or removable storage devices. The memory 110 may store a wide variety of data files 164 and/or various program modules, such as an operating system ("OS") 165, one or more host modules, and/or one or more transaction modules or transaction applications, such as mobile commerce application program 108. The data files 164 may include any suitable data that facilitates the operation of the merchant system computer 112 and/or associated merchant device 114, and/or interaction of the merchant system computer 112 and/or associated merchant device 114 with one or more other components (e.g., one or more one or more consumer or mobile devices 120(1)-120(N), one or more server transaction processing systems 106, one or more merchant acquiring platforms, one or more issuer systems, one or more financial institution systems 124, etc.) of the system 100. For example, the data files 164 may include information associated with one or more websites 134 (hosted by either a third-party and/or merchant), webpages, inventory information associated with available products and/or services, acquiring platform information, service provider information, merchant-specific information (such as the number of fuel dispensing pumps and the products and services offered by the merchant), information associated with the generation of payment transactions, customer information, demographic data, and/or routing information for payment transactions.

The OS 165 may be any suitable module that facilitates the general operation of the merchant system computer 112, as well as the execution of other program modules. For example, the OS 165 may be any currently known or future developed operating system including, but not limited to, Microsoft Windows®, Apple OSX™, Unix, a mainframe computer operating system (e.g., IBM z/OS, MVS, OS/390, etc.), or a specially designed operating system. The host modules may include any number of suitable host modules that manage interactions and communications between the merchant system computer 112 and/or associated merchant device 114, and one or more external devices, such as the consumer or mobile devices 120(1)-120(N). For example, the host modules may include one or more Web server modules that facilitate the hosting of merchant websites and/or third-party websites, such as website(s) 134, webpages, and/or transaction processing webpages. As another example, the host modules may include one or more cellular modules and/or systems that facilitate cellular communication with one or more mobile devices 120(1)-120(N).

The transaction modules or applications, such as the mobile commerce application program 108, may include any number of suitable software modules and/or applications that facilitate the collection and/or processing of information association with a purchase transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer or mobile device 120(1)-120(N) (e.g., a mobile device identifier, etc.). Based at least in part upon the collected information, the transaction modules or applications may generate and/or communicate a wide variety of transaction-related requests, such as payment processing and/or authorization requests and/or advertising requests. One example of the operations that may be performed by a transaction module or mobile commerce application program 108 and/or the merchant system computer 112 and/or associated merchant device 114 is described in greater detail below with reference to FIG. 2.

With continued reference to the merchant system computer 112 and/or associated merchant device 114, the one or more I/O interfaces 130 may facilitate communication between the merchant system computer 112 and/or associated merchant device 114 and one or more input/output devices; for example, one or more user interface devices, such as a display, a keypad, a mouse, a pointing device, a gesture detection device, an eye movement detection device, a control panel, a touch screen display, a remote control, a microphone, a speaker, a consumer device reader, etc., that facilitate user interaction with the merchant system computer 112 and/or associated merchant device 114. The one or more network interfaces may facilitate connection of the merchant system computer 112 and/or associated merchant device 114 to one or more suitable networks, such as 126, and/or communication links. In this regard, the merchant system computer 112 and/or associated merchant device 114 may receive and/or communicate information to other components of the system 100, such as the consumer or mobile devices, for example 120(1)-120(N), the server transaction processing systems 106, and/or the issuer or financial institution systems 124.

In certain example embodiments, a merchant system computer 112 and/or associated merchant device 114 can be associated with a merchant location 136, such as a retail store (e.g., gas station) or "bricks and mortar"-type establishment. The merchant location 136 and/or merchant device 114 may include a code 138, such as a QR code, bar code, radio frequency identifier (RFID) tag, and/or other machine readable code, wherein consumers can utilize a respective consumer or mobile device 120(1)-120(N) to scan or read the code to check-in to a merchant or to obtain information associated with a merchant, such as product pricing information. Alternatively, the merchant system computer 112 and/or the associated merchant device may include or be communicably coupled to geolocation devices that are operatively coupled to one or more location services 132 for sensing and identifying customer mobile devices that are within a predetermined distance of the merchant location.

Additionally, any number of consumer or mobile devices 120(1)-120(N) may be provided or otherwise supported. Examples of suitable consumer or mobile devices can include, but are not limited to, personal computers and/or mobile communication devices (e.g., mobile phones, smart phones, etc.), etc. According to an example aspect of the disclosure, a consumer or mobile device, such as 120(1) may be a suitable device that is capable of interaction with other components of the system 100 during the request and/or completion of an e-commerce transaction. For example, a personal computer or mobile device may be utilized to access one or more e-commerce websites, such as website(s) 134, including those hosted by the merchant system computer 112 and identify products and/or services to be purchased, request a purchase and/or interact with the merchant system computer 112, merchant system device 114, and/or other components of the system 100 (e.g., the server transaction processing system 106, etc.) during the completion of a payment transaction. In one example embodiment, a mobile device, such as 120(1), may be utilized to request one or more products and/or services in a payment transaction, provide consumer identification information, and/or to provide validation information during the processing of the payment transaction.

As desired, a consumer or mobile device, such as 120(1), may be any number of processor-driven devices, including but not limited to, a personal computer, a mobile computer, an application-specific circuit, a minicomputer, a microcontroller, and/or any other processor-based device. The components of an example mobile device, such as 120(1), will now be described in greater detail, and it will be appreciated that a personal computer may include similar components. With reference to the mobile device 120(1), the mobile device 120(1) may utilize one or more processors 140(1) to execute computer-readable instructions that facilitate the general operation of the mobile device 120(1) (e.g., call functionality, etc.) and/or communication with a merchant system computer 112, merchant system device 114, and/or other components of the system 100 (e.g., the server transaction processing system 106) for product selection and payment transaction purposes, for providing access to purchased products, as well as for the receipt of merchant selected advertising, loyalty awards, coupons and promotional information. As a result of executing these computer-readable instructions, a special purpose computer or particular machine may be formed that facilitates the completion of payment transactions, provides access to purchased products, and/or provides for the receipt of loyalty awards, coupons and/or promotional information.

In addition to having one or more processors, the mobile device, such as 120(1)-120(N), may further include and/or be associated with one or more memory devices 118(1)-118(N), input/output ("I/O") interfaces 142(1)-142(N), network interfaces, and/or location services 144(1)-144(N). The memory 118(1)-118(N) may be any computer-readable medium, coupled to the one or more processors 140(1)-140(N), such as random access memory ("RAM"), read-only memory ("ROM"), and/or removable storage devices. The memory 118(1)-118(N) may store a wide variety of data files and/or various program modules, such as an operating system ("OS") 156(1)-156(N) and/or one or more transaction modules or applications, such as a mobile commerce application program 116(1)-116(N). In certain example embodiments, a mobile device, such as 120(1), may include one or more secure elements 155(1)-155(N) configured to securely store and/or access information, such as payment applications, payment account information, validation information (e.g., a stored mPIN, etc.), encryption information, and/or other transaction-related information. The secure elements 155(1) may be stored in the memory 118(1) and/or included as a separate component of the mobile device 120(1). For example, a secure element 155(1)-155(N) may be a separate chip that is configured to communicate with primary computing functionality for the mobile device. As desired, one or more of the transaction modules, such as the mobile commerce application program 116(1), may be stored on a secure element. The transaction modules may be invoked by other components of the mobile device 120(1) and/or by one or more other components of the system 100, such as the merchant system computer 112, merchant system device 114, and/or the server transaction processing system 106.

The data files may include any suitable data that facilitates the operation of the mobile device, such as 120(1), and/or interaction of the mobile device 120(1) with one or more other components (e.g., a merchant system computer 112, merchant system device 114, a server transaction processing system 106, etc.) of the system 100. For example, the data files may include information associated with accessing the secure elements 155(1)-155(N), information associated with invoking transaction modules, and/or information associated with accessing and/or processing validation data (e.g., an mPIN, etc.). The OS 162(1)-162(N) may be a suitable module that facilitates the general operation of the mobile device, such as 120(1), as well as the execution of other program modules. For example, the OS 162(1)-162(N) may be any currently known or future developed operating system including, but not limited to, a suitable mobile OS or a specially designed operating system. As desired, the mobile device 120(1) may also include one or more suitable browser applications that facilitate the access of one or more webpages hosted by the merchant system computer 112, and/or third-party or merchant websites, such as 134.

The transaction modules may include one or more suitable software modules and/or applications configured to facilitate purchase transactions, such as payment transactions, facilitate the receipt and display of loyalty awards, coupons and/or promotional information, and/or provides access to purchased products on behalf of the mobile device, such as 120(1). In certain embodiments, a transaction module or mobile commerce application program, such as 116(1), may also facilitate communication with a server transaction processing system, such as 106, or a trusted service manager. A wide variety of suitable techniques may be utilized to install a transaction module on the mobile device, such as 120(1). For example, a transaction module may be provisioned to the mobile device 120(1) by a server transaction processing system 106 and/or by an issuer or financial institution system 124. Additionally, during the installation and/or registration of the transaction module, a wide variety of validation information may be generated and/or identified. For example, a consumer, such as 122(1) may be prompted to enter an mPIN, such as a multi-character and/or multi-numeral code, to an associated mobile device, such as 120(1). As desired, the mPIN may be stored on a secure element 155(1)-155(N). Additionally, the PIN and/or a wide variety of information derived from the mPIN (e.g., an encrypted mPIN, etc.) may be provided to one or more issuer or financial institution systems, such as 124, or an issuer system associated with an issuer of a payment account (e.g., a credit account, a debit account, a pre-paid card account, a gift card account, a stored value account, etc.) that is associated with the transaction module.

According to an aspect of the disclosure, following registration and/or activation of the transaction module, the transaction module may be invoked during a payment transaction. For example, the transaction module may be invoked by a merchant system computer 112, merchant system device 114, or by a server transaction processing system 106 at the request of the merchant system computer 112 and/or merchant system device 114. In certain example embodiments, the transaction module may be invoked following a consumer request to conduct a payment transaction and the identification of the mobile device, such as 120(1), by the merchant system computer 112, merchant system device 114, or server transaction processing system 106. Following the invocation of the transaction module, a request for validation data and/or payment account data may be received. As desired, the transaction module may prompt the consumer for entry of an mPIN, and an mPIN value entered by the consumer, such as 122(1), (e.g., by a keypad, touchscreen, etc.) may be identified. A stored mPIN value may then be accessed from the secure element 155(1)-155(N) and compared to the entered mPIN value. In this regard, the entered mPIN value may be authenticated. If the entered mPIN value is not authenticated, then the transaction module may reject a proposed transaction and direct the output of a suitable error message.

If, however, the entered mPIN value is authenticated, then the transaction module may provide payment account data and associated validation data to the merchant system computer 112, merchant system device 114, or server transaction processing system 106. A wide variety of different types of validation data may be provided as desired in various embodiments, including but not limited to, an mPIN entered by the consumer 122(1), an indication that the entered mPIN was authenticated by the mobile device 120(1) and/or the secure element 155(1), an encrypted version of the entered mPIN, and/or an encrypted version of the stored mPIN. In one example embodiment, an entered mPIN may be authenticated, encrypted, and provided to the merchant system computer (or a server transaction processing system). In this regard, the encrypted mPIN may be provided to the issuer or financial institution system, such as 124, for authentication and/or risk analysis purposes.

The one or more I/O interfaces, such as 142(1)-142(N), may facilitate communication between the mobile device, such as 120(1) and one or more input/output devices; for example, one or more user interface devices, such as a display, a keypad, a touch screen display, a microphone, a speaker, etc., that facilitate user interaction with the mobile device 120(1). Further, the one or more network interfaces may facilitate connection of the mobile device, such as 120(1), to one or more suitable networks, for example, the network(s) 126 illustrated in FIG. 1. In this regard, the mobile device, such as 120(1), may receive and/or communicate information to other components of the system 100.

In some embodiments, any number of server transaction processing systems, such as server transaction processing system 106, may be provided or otherwise supported. A server transaction processing system 106 may facilitate the backend processing of a purchase transaction, such as a payment transaction, the identification of a consumer's mobile device 120(1) based on consumer identification information, demographic and/or purchase history information for the consumer associated with the consumer mobile device 120(1). In certain example embodiments, an issuer system may include similar components as those discussed above for the merchant system computer 112 and/or merchant system device 114. For example, server transaction processing system 106 may include any number of processors 146, memories, I/O interfaces 148, and/or network interfaces. In certain example embodiments, a server transaction processing system 106 can include one or more transaction modules, such as a mobile commerce application program 102 and/or a social network integration program application 150. In any instance, the transaction modules can facilitate communications and/or interactions with any number of consumer or mobile devices such as mobile devices 120(1)-120(N), merchant computer systems such as 112, merchant computer devices 114, data stores 151, third-party websites such as 134, and financial institution systems such as 124. In certain embodiments, a service transaction processing system, such as 106, can host a social network integration program application, such as 150, configured to communicate via any number of social network services and/or websites to obtain information from the services and/or websites, for example, product and/or service data 152 on a third party or merchant website, such as 134.

Furthermore, as desired, a server transaction processing system, such as 106, may provide a wide variety of transaction module provisioning services. Additionally, a server transaction processing system, such as 106, may provide a wide variety of transaction-related and/or value added services ("VAS") in association with transactions, such as targeted advertising services, coupon redemption services, loyalty/reward services, location-based services, electronic receipt services, product registration services, warranty services, coupon issuance services, and/or the routing of a proposed transaction to an issuer for approval and/or settlement purposes. In certain example embodiments, a server transaction processing system, such as server transaction processing system 106, may include similar components as those discussed above for the merchant system computer, such as 112, and/or merchant system device, such as 114. For example, a server transaction processing system, such as 106, may include any number of processors, memories, I/O interfaces, and/or network interfaces.

In some embodiments, any number of issuer or financial institution systems, such as 124, may be provided or otherwise supported. An issuer or financial institution system, such as financial institution system 124, may facilitate the backend processing of a payment transaction, such as a payment for one or more products and/or services selected by an consumer at a merchant location. For example, an issuer or financial institution system, such as financial institution system 124, may host a payment processing application program, such as payment processing application program 154, or module to facilitate the approval, authentication, and/or settlement of a payment transaction. In certain example embodiments, a payment transaction may be routed to an issuer or financial institution system, such as financial institution system 124, via a suitable transaction network (e.g., a debit network, a credit network, etc.), and the issuer or financial institution system, such as financial institution system 124, may evaluate the payment transaction via the payment processing application program, such as payment processing application program 154, or module. An approval or rejection of the payment transaction may then be output for communication to a merchant system computer, such as merchant system computer 112, and/or merchant system device 114. The issuer or financial institution system, such as financial institution system 124, may then facilitate the settlement of the payment transaction. In certain embodiments, an issuer or financial institution system, such as financial institution system 124, may include similar components as those discussed above for the merchant system computer 112 and/or merchant system device 114. For example, an issuer or financial institution system, such as financial institution system 124, may include any number of processors 156, memories 158, I/O interfaces 160, and/or network interfaces. In certain example embodiments of the disclosure, an issuer or financial institution system, such as financial institution system 124, may receive validation information in association with a purchase a transaction.

A wide variety of suitable networks, individually and/or collectively shown as network(s) 126, may be utilized in association with embodiments of the disclosure. Certain networks may facilitate use of a wide variety of e-commerce-related communication. For example, one or more telecommunication networks, cellular networks, wide area networks (e.g., the Internet), and/or other networks may be provided or otherwise supported. Other networks may facilitate communication of transaction-related communications. For example, one or more transaction networks, such as branded networks (e.g., a VISA network, etc.), debit and/or PIN networks, and/or a wide variety of other suitable transaction networks may facilitate communication of transaction-related communications, such as e-commerce transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration. Other known mobile transaction systems are described in U.S. Patent Publication Number 2013/0097031, entitled "Systems and methods for Facilitating Point of Sale Transactions," which was filed on Oct. 12, 2012 and in U.S. Patent Publication Number 2014/0074605, entitled "Systems and methods for Facilitating Purchases at a Gas Station via Mobile Commerce," which was filed on Sep. 11, 2013, the entire contents of which are hereby incorporated by reference for all purposes.

Figure 2:
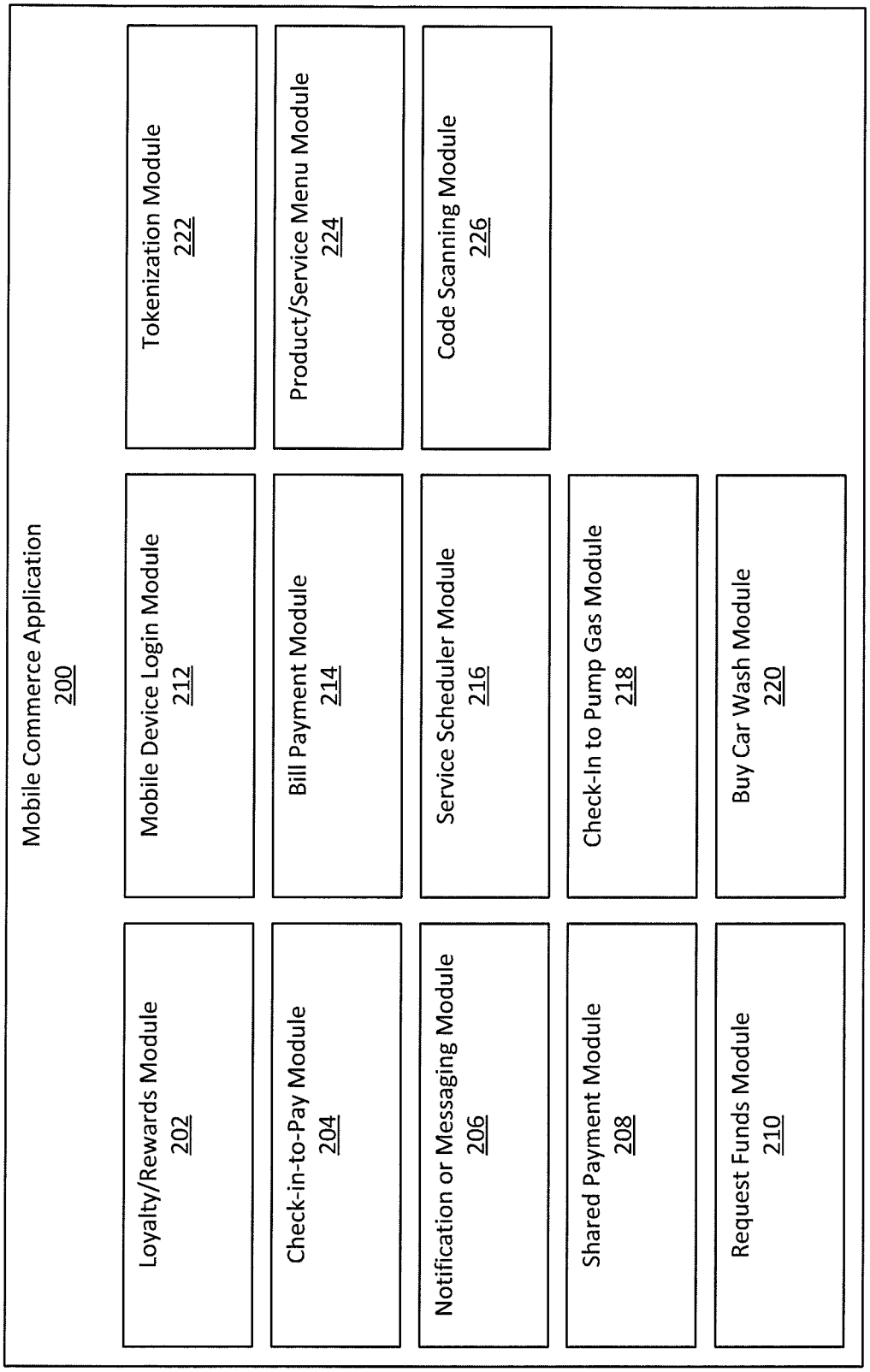
FIG. 2 is a system diagram showing an example mobile application block diagram for conducting mobile transactions according to embodiments.

FIG. 2 shows an example mobile commerce application program 200, similar to the mobile commerce application programs 102, 108, and 116(1)-116(N) in FIG. 1, that can operate with respect to the system 100 shown in FIG. 1. The mobile commerce application program 200 shown in FIG. 2 can include, for example, a loyalty/rewards module 202 that may track a user's purchases and provide coupons, discounts, and/or other rewards based on a user's transaction history. Mobile commerce application program 200 may also include a check-in-to-pay module 204 that checks a user into the application upon detecting the mobile device is in proximity to a transaction device, a notification or messaging module 206, a shared payment module 208, a request funds module 210, a mobile device login module 212, a bill payment module 214, an service scheduler module 216, a check-in to pump gas module 218, a buy car wash module 220, a tokenization module 222 that may tokenize payment information and other sensitive data, a product/service menu module 224, and/or a code scanning module 226. Some or all of the modules 202-226 are described herein with respect to certain mobile commerce functionality, associated processes, and features. FIGS. 3-12 illustrate certain processes associated with some or all of the modules including the example mobile commerce application program 200 in FIG. 2. While the various modules 202-226 are shown by way of example, fewer or greater numbers of modules can be present in various embodiments of a mobile commerce application program. Furthermore, various functionality described with respect to one module may be performed by multiple modules in other embodiments of the disclosure.

Mobile Application Enrollment

In some embodiments, systems and methods are provided for enrolling customers in mobile transaction services. The user's payment media may be linked to a mobile or web-based application. In one example implementation, a merchant, such as a gas station merchant, can create a mobile commerce application program, also known as a mobile app, mobile wallet, or wallet app. A consumer can download the mobile commerce application program onto the consumer's mobile device and store certain personal and/or payment method information in association with the mobile commerce application program. Such enrollment may be particularly secure, as by enrolling the mobile device and/or application while a verified transaction with the payment media is conducted ensures that both the mobile device and the payment media must be present. This reduces the likelihood of fraud as a user needs to have both items in their possession.

For example, a user may arrive at a merchant and use a payment card to conduct a transaction at a point of sale device of the merchant. The user may be prompted to enter a phone number or other identifier associated with the user's mobile device and/or an account of the user. An SMS message and/or other communication may be sent to the user including a link to a download for a mobile application. The user's payment information may be associated with the downloaded application. Within the mobile application, the user may select a user ID and password or other identity credential, and may then use the mobile application to access the payment account for purchases using the mobile device.

In the above implementations and other embodiments described herein, a mobile commerce application program, sometimes referred to as a mobile app or wallet app, can be hosted or otherwise stored on a mobile device, client device, server device, or any other processor-based device. Multiple instances of mobile commerce application programs can operate within a network environment, such as described in FIG. 1, and each may have similar or different functionality, such as described in FIG. 2, according to various example embodiments and implementations as described herein.

Figure 3:
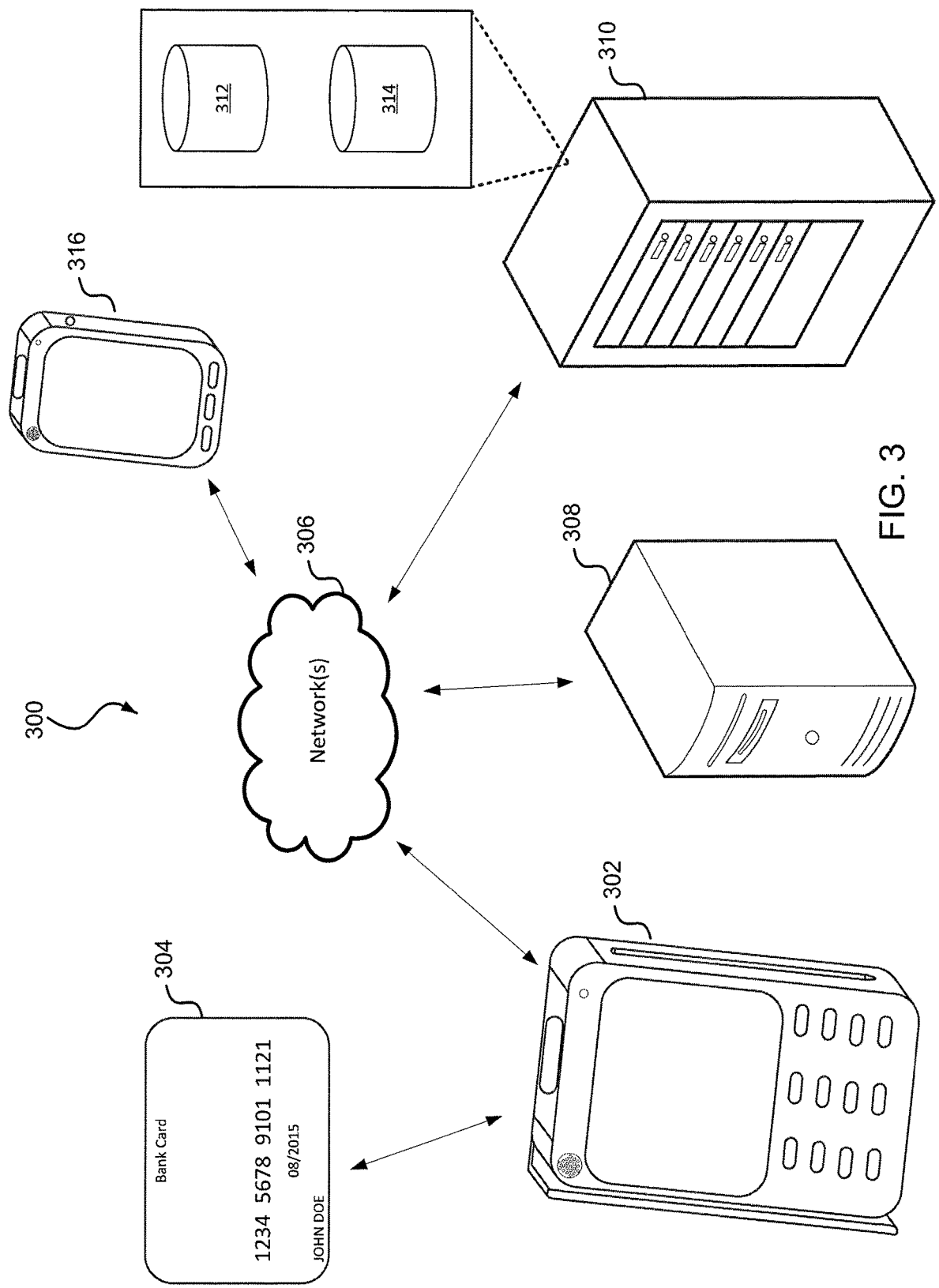
FIG. 3 is a system diagram showing a system for enrolling a mobile device in a mobile transaction system according to embodiments.

FIG. 3 depicts a system 300 for enrolling a user in a mobile transaction system. System 300 may include a merchant POS device 302 configured to receive data, such as payment data, from one or more types of payment media 304. The POS device 302 may be any device capable of conducting a purchase transaction and may include a display, one or more payment readers, and/or one or more input devices, such as a touchscreen or keypad whereby a user may provide additional input. The payment media 304 may include credit cards, debit cards, contactless cards, and/or other payment media associated with a payment account. The payment media 304 may be able to communicate payment data, such as an identifier of the payment account, to facilitate the completion of transactions. For example, payment media 304 may communicate the payment data to the POS device 302. The payment data may be stored on POS device, a computing device in communication with the POS device, and/or on a cloud or remote server. The communication of payment data, as well as the communication of other data, may be used to enroll the user in the mobile payment system. For example, upon receiving the payment information, the POS device 302 may receive a determination that the payment account is not linked to a user account of a mobile transaction system. The POS device 302 may query the user as to whether the user would like to enroll, and upon confirmation, may provide a prompt requesting the user's mobile phone number. The payment data and/or phone number may be stored in a merchant system. For example, the POS device 302 may store the information locally and/or the POS device 302 may communicate the information to a remote and/or central server 308. POS device 302 may be in communication with one or more other components of system 300, such as central server 308, using a network 306.

Network 306 may be a local area network (LAN) and/or other private or public wired and/or wireless networks. Network 306 may utilize one or more of Wi-Fi, ZigBee, Bluetooth™, Bluetooth™ Low Energy, a cellular communications protocol such as 3G, 4G, or LTE, and/or any other wireless communications protocol. Network 306 may be communicatively coupled with one or more of the components of the system to facilitate communication between the various components. It will be appreciated that one or more different network connections may be used in accordance with the invention, and that the use of a single network 306 to enable communications is merely one example of such configurations. For example, each component may be communicatively coupled with other components using a separate network for one or more of the connections.

The server 308 may be coupled with a network attached storage (NAS) 310, which can include the one or more databases. NAS 310 stores data for the system that is used for facilitating mobile transactions and performing other functions and features described herein. NAS 310 can be any type of storage device that is accessible over a network, including a storage area network (SAN). In other embodiments, the databases can be stored in server 308 rather than on a separate physical machine dedicated to data storage.

In this embodiment, NAS 310 stores an account database 312 and an mobile device database 314. Account database 312 can be used to store user accounts that are used for payment and conducting other transactions. For example, user identify information, purchase history, discounts, payment account information, and other information associated with accounts can be stored in account database 312. Mobile device database 314 may include identifiers associated with each registered mobile device within the system. Databases 312 and 314 may be linked or otherwise associated with one another such that data may be cross-referenced between the two. It should be understood that account database 312 and identifier database 314 are only example databases that can be stored in NAS 310. In other embodiments, different or additional databases can also be stored. Additionally, it will be appreciated that multiple databases may be merged into a single database.

Upon receipt of the user's phone number, the merchant system (the POS device 302, the central server 308, and/or other component of the merchant system) may send a notification to the user's mobile device 316 using the phone number. The notification may be in the form of an SMS message, push notification, email message, and/or other message that provides access to a download of a mobile application usable to conduct mobile transactions with the merchant. For example, the notification may include a link to a download source of the mobile application, such as a download hosted by a merchant website and/or central server 308. In other embodiments, the notification may direct a user of the mobile device 316 to a download location for the mobile application on a mobile application database operated by a third party. For example, the download location may be an "app store" or other database of mobile applications. Directing the user to the database may include sending a command to the user's mobile device 316 to open an application database to a specific location or address. In other embodiments, the notification may include instructions directing the user to navigate to the download location using a browser of the mobile device 316 and/or using an application database.

Upon downloading the mobile application, the user may enter into an interface of the mobile application identity credentials, such as a user name, password, biometric input, and/or other identifying information. The identity credentials may be used to access a user account that is created and associated with the payment data, mobile application, and/or mobile device 316.

Figure 4:
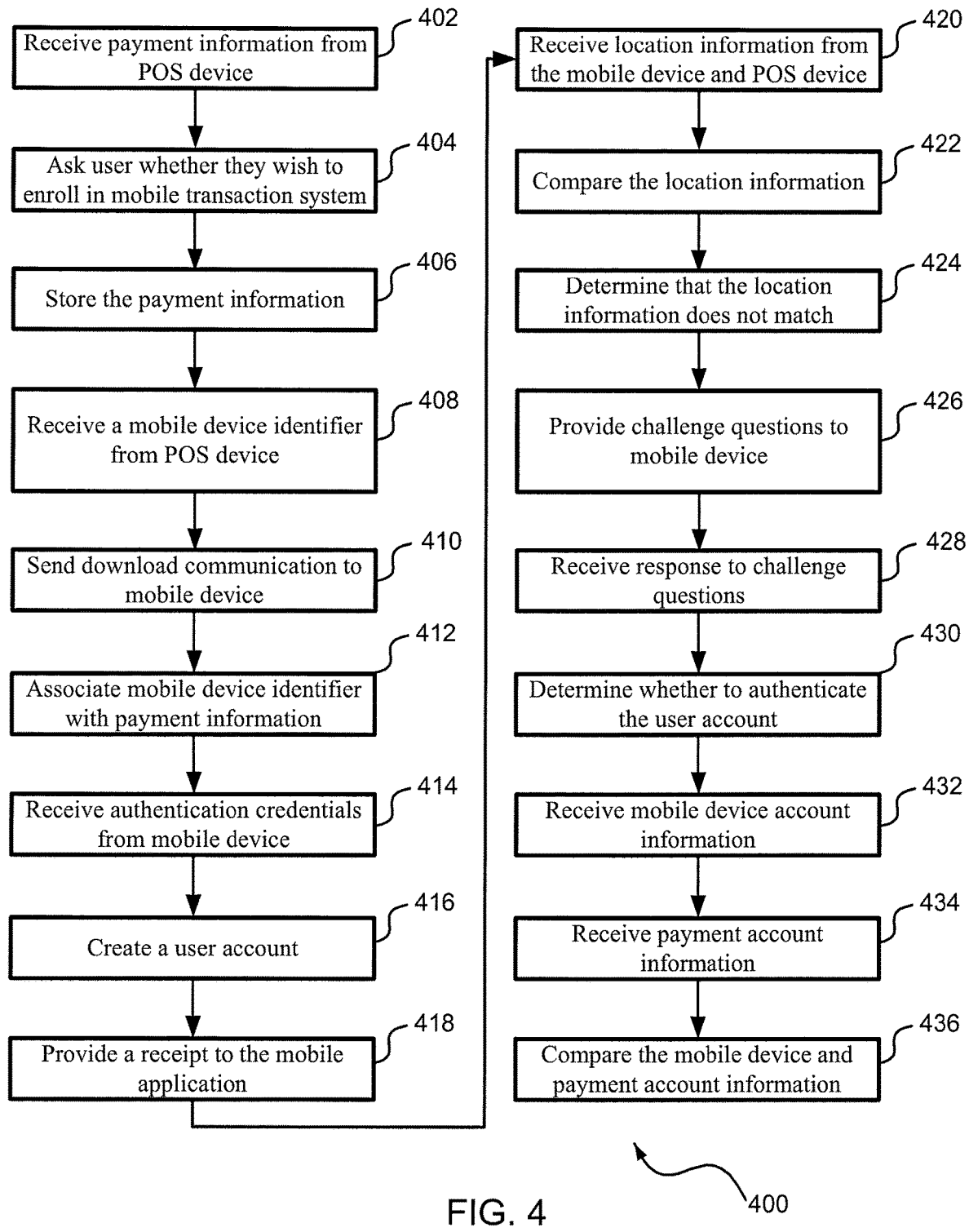
FIG. 4 is a flowchart of a process for enrolling a mobile device in a mobile transaction system according to embodiments.

FIG. 4 depicts a flowchart of another embodiment of a process 400 for enrolling a mobile device for use in mobile transactions. Process 400 may be performed by one or more components of a system such as system 300 described above with regard to FIG. 3. For example, process 400 may be performed by a merchant POS device, central server, and/or other computing device. Process 400 may begin with receiving an input from a point of sale device of a merchant at block 402. The input may include payment information associated with a payment media, where the payment information originates from an interaction of the payment media with a payment reader of the point of sale device during a purchase transaction. For example, a user completing a purchase transaction at a merchant POS device may present a payment media, such as a credit/debit card, contactless payment card, and/or other payment media associated with a payment account, to the POS device. The payment information may be received from a magnetic strip, microchip, and/or other data storage of the payment media. The payment information may be checked against a database of existing mobile transaction accounts to determine whether a mobile transaction account exists that is associated with the payment media and/or payment account. For example, a POS device may look up, locally and/or at a central server, whether the payment information is associated with an existing mobile transaction account. Upon determining that the payment information is not associated with an existing account, the user may be queried as to whether he would like to enroll in a mobile transaction system at block 404. For example, a message be displayed on the POS device prompting the user to select whether or not he would like to enroll. In embodiments where a central server is performing process 400, the central server may send a command to the POS device to display the prompt. Upon receiving a selection of a confirmation of a desire to enroll in the mobile transaction system, such as by a user interacting with a button and/or portion of a touch display of a POS device, the payment information received from the payment media may be stored at block 406. For example, the payment information may be stored in a database of payment accounts in a central server or NAS storage, such as described in FIG. 3. At block 408, A mobile device identifier may be received at the point of sale device, which may then be communicated to a central server or other computing device.

A notification or other communication may be sent to a mobile device associated with the mobile device identifier at block 410. The communication may provide the user and/or mobile device with access to a download for a mobile application associated with the merchant. In some embodiments, the communication may include a link to a download source of the mobile application. In other embodiments, the notification may direct a user of the mobile device to a download location for the mobile application on a mobile application database. The user may download, install, and execute the mobile application on the mobile device. The mobile device identifier and payment information may be associated with one another at block 412. At block 414, authentication credentials may be received from the mobile application being executed on the mobile device. The authentication credentials may include a username, a password, a biometric input, other identification information, or combinations thereof. A mobile transaction account or user account may be created that is associated with the mobile device identifier, the payment information, and the authentication credentials at block 416. The account may be set up while the user is completing the transaction. At block 418, a receipt of the transaction may then be sent to the mobile application, such as using a push notification, SMS, and/or email. The user may then utilize the mobile application to complete future transactions with the merchant.

In some embodiments, either prior to, or upon, the creation of the user account additional authentication measure may be taken, such as those described elsewhere herein. For example, at block 420, location information may be received from the mobile device and the point of sale device. This may be done using networks such as network 306 described above. For example, the mobile application executed on the mobile device may retrieve location information, such as GPS data and/or other location data from the mobile device and provide this location information to the central server over a cellular data network, a Wi-Fi network, and/or other wireless network. In some embodiments, a short range network, such as NFC, Bluetooth™, or other short range wireless network may be used to provide the mobile device's location to the POS device, which may relay the location information to the central server. The POS device may communicate its own location to the central server. For example, the POS device may retrieve its own GPS data, IP address data, and/or other location information, such as location information that is programmed into the POS device. This location information may be communicated over a public or private network to the central server. The location information from the mobile device may then be compared with the location information from the point of sale device to authenticate the user account at block 422. This ensures that a user of the payment media is the holder of the mobile device since both the payment media and the mobile device must be present to complete the transaction, download the mobile application, and provide identity credentials needed to create the account.

In some embodiments, a determination that the location information from the mobile device does not match the location information from the point of sale device may be made at block 424. As an additional authentication measure, one or more challenge questions may be communicated to the mobile application at block 426. These challenge questions may be presented on a display of the mobile device and a user may input answers to the questions. The challenge questions may include questions that verify previous purchases made using the payment media, information related to an account associated with the mobile device, and/or a combination thereof. A response to the one or more challenge questions may be received from the mobile application at block 428. Based on the received response or responses, a determination made be made at block 430 of whether to authenticate the user account.

Additional authentication measures may compare information known about the owner of the payment account with the owner of an account associated with the mobile device to ensure the two owners are the same. For example, at block 432, mobile device account information associated with the mobile device may be received from a carrier network provider of the mobile device. The mobile device account information may include user identity information associated with the user of the mobile device account. For example, the user's name, address, and/or other identification information may be received. At block 434, payment account information associated with the payment media may be received. For example, the payment information may be received from a financial institution, such as an issuer of the payment media associated with the payment account, may provide the payment account information. The payment account information may include user identity information associated with the user of the payment account. At block 436, the user identity information from the financial institution may be compared with the user identity information from the carrier network provider to authenticate the user account. For example, when the two sets of identity information match, it may be determined that the user of the payment media and the user of the mobile device are one in the same.

Remote Activation of a Transaction Device

In some embodiments, systems and methods are provided for remotely activating transaction devices. Transaction devices may include devices that are capable of receiving a payment, such as POS devices. Some transaction devices may also be configured to dispense a product, such as fuel pumps, vending machines, and the like. While the discussion herein is largely centered around transaction devices such as fuel pumps, it will be appreciated that similar systems and methods may be implemented with non-dispensing transaction devices, with functionality related to the dispensing of a product being omitted. Users may have the ability to remotely select, such as by using a mobile application on a mobile device as described in FIGS. 1-5, a particular transaction device, a product type, a product amount, and/or a payment type. Users may also remotely activate the transaction device, dispense a product from the transaction device, deactivate the transaction device, and/or receive a receipt.

In one example, a customer using a web-based or mobile application may arrive at a gas station having one or more fuel pumps serving as transaction devices. The customer may select a particular fuel pump using the mobile application. The customer may then user the mobile application to select a type of fuel to dispense and/or an amount of fuel to dispense. The pump may be remotely activated and the customer may pump the fuel. The pump may be deactivated upon dispensing the selected amount of fuel, and a receipt of the transaction may be sent to the mobile application.

Figure 5:
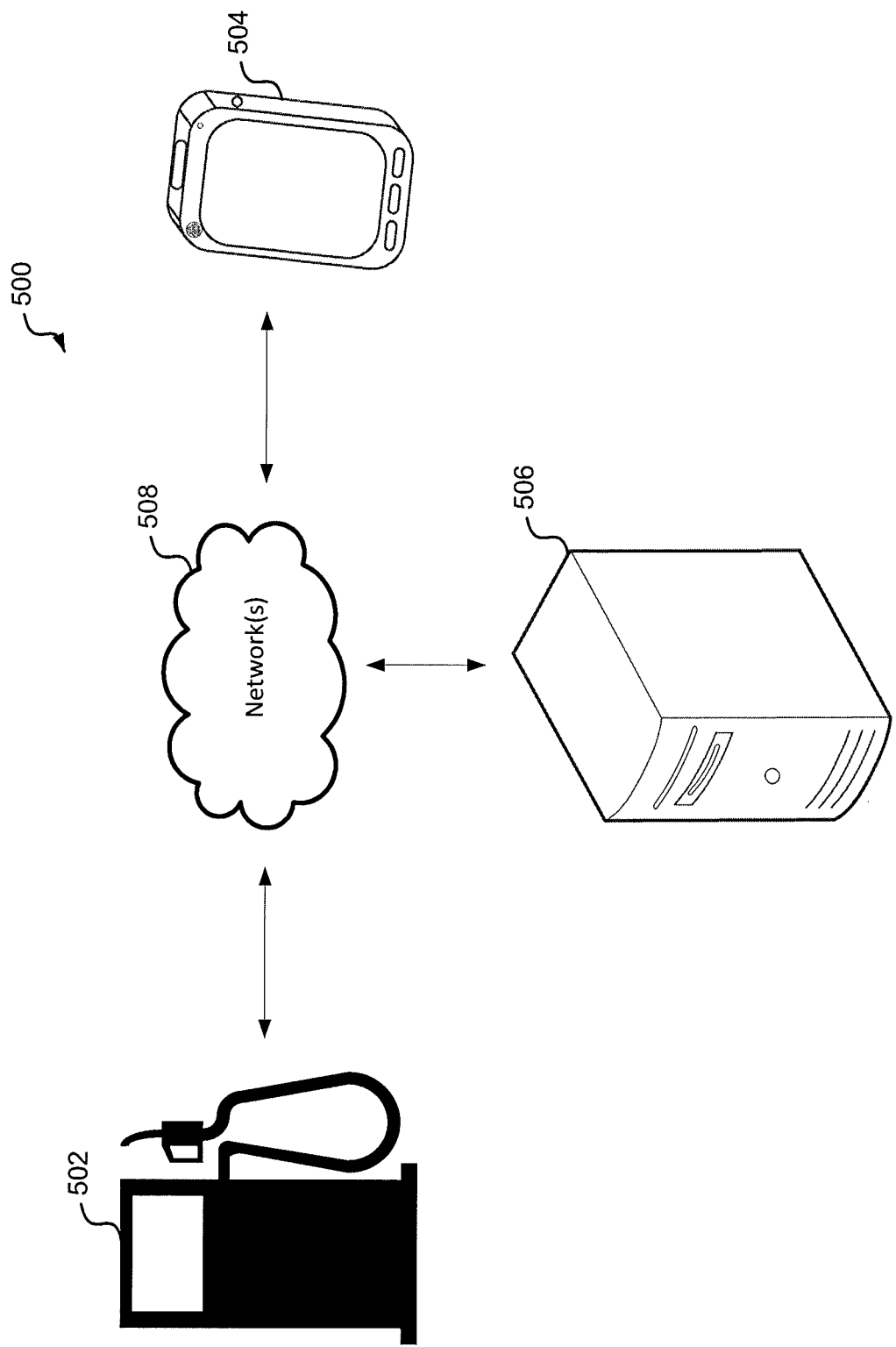
FIG. 5 is a system diagram showing a system for remotely activating a transaction device according to embodiments.

FIG. 5 depicts a system 500 for enrolling a user in a mobile transaction system. System 500 may include one or more transaction devices 502, each configured to receive data from mobile applications being executed on mobile devices 504 and/or a server 506 or other computing device of the merchant. Such data may include payment information, product selections, product amounts, activation authorizations, and/or other information related to purchase transactions. The transaction device 502 may be a device that is capable of conducting a transaction and/or dispenses a product. For example, transaction device 502 may include fuel pumps, vending machines, other devices for dispensing products, and/or POS devices. Transaction device 502 may include a display, a payment reader, and/or one or more input devices, such as a touchscreen, buttons, and/or a keypad, and may be configured to communicate with mobile devices 504 and/or servers 506 over one or more networks 508.

Network 508 may be a local area network (LAN) and/or other private or public wired and/or wireless networks. Network 508 may utilize one or more of Wi-Fi, ZigBee, Bluetooth™, Bluetooth™ Low Energy, a cellular communications protocol such as 3G, 4G, or LTE, and/or any other wireless communications protocol. Network 508 may be communicatively coupled with one or more of the components of the system to facilitate communication between the various components. It will be appreciated that one or more different network connections may be used in accordance with the invention, and that the use of a single network 508 to enable communications is merely one example of such configurations. For example, each component may be communicatively coupled with other components using a separate network for one or more of the connections.

Transaction device 502 may be configured to receive an input selecting the transaction device 502. For example, a user may approach a gas station and use a mobile application on the mobile device 504 to select the transaction device 502, such as a fuel pump. This selection may be communicated to the transaction device 502 by the mobile device 504 over network 508 and/or may be received from the mobile device 504 at server 506, which may then communicate the selection to the transaction device 502. Similarly, a selection of a product type and/or product amount may be communicated to the transaction device 502. For example, where the transaction device 502 is a fuel pump, a user may use the mobile application to select a fuel type and/or an amount of fuel to dispense. Based on the selected product amount, a payment may be authorized. For example, payment information, including an identifier of a payment account, may be transmitted by the mobile application to the to the transaction device 502 and/or the server 506, which may then communicate an authorization request to a financial institution, such as an issuer of the payment account. The financial institution may respond with an approval message and the transaction device 502 may be authorized to dispense the selected amount of the selected product. In the fuel example, the fuel pump may be activated and the user may be able to pump the selected amount and type of fuel. Upon dispensing the selected amount of product, the transaction device 502 may be deactivated and a payment receipt may be communicated over network 508 to the mobile device 504.

Figure 6:
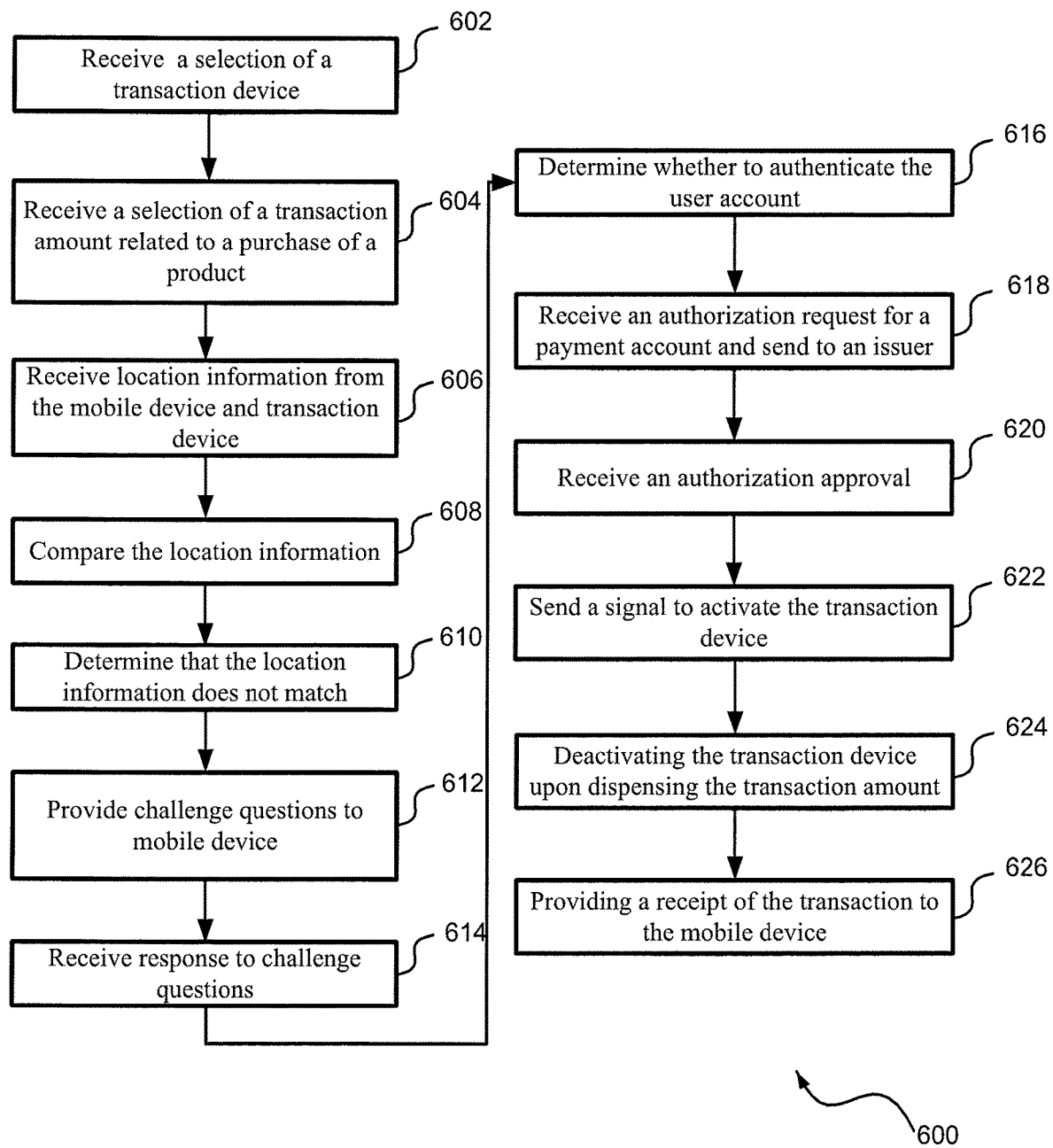
FIG. 6 is a flowchart of a process for remotely activating a transaction device according to embodiments.

FIG. 6 depicts a flowchart of a process 600 of a method for remotely activating a transaction device using a mobile device. Process 600 may be performed by one or more components of a system such as system 500 described above with regard to FIG. 5. For example, process 600 may be performed by a transaction device, central server, and/or other computing device. Process 600 may include receiving a mobile device identifier from a mobile application executed on a mobile device that is within a detection range of a transaction device. The mobile device identifier may be associated with the mobile device, such as a phone number of the mobile device. The mobile device may automatically send the mobile device identifier upon being within the detection range, or the user may execute the mobile application and provide an input of a merchant associated with the transaction device and/or of the transaction device itself. Automatic detection of the mobile device may be done in multiple ways. For example, the merchant and/or transition device may include one or more beacons that emit signals that are detectable by the user's mobile device when in the detection range. In some embodiments, the location of the mobile device may be determined using the mobile device's GPS sensors and/or other location services. This location may be compared to known locations of merchants and/or transaction devices, such as locations stored within and/or accessible by the mobile application.

At block 602, a selection of the transaction device may be received from the mobile application. The selection may include an identifier associated with the transaction device. This is particularly useful in embodiments where multiple transaction devices are present at a single location, as a particular transaction device needs to be activated. The selection of the transaction device may be done in several manners. For example, the user may select a transaction device, such as a fuel pump, from a list or other display of available transaction devices provided by the mobile application. In other embodiments, a short range wireless signal, such as NFC, RFID, and/or other signals may be emitted from the transaction device and/or from a beacon positioned on or near the transaction device. The signal may include the identifier of the transaction device such that when received by the mobile device when the mobile device is positioned within a detection range of the transaction device, the mobile device may communicate the identifier to a central server. In other embodiments, a barcode, QR code, and/or other image positioned on or near the transaction device may be scanned by the mobile device to receive the transaction device identifier, which may then be communicated to the server.

At block 604, a selection of a transaction amount related to a purchase of a product may be received from the mobile application. For example, a user may interact with a user interface of the mobile application to select a dollar amount and/or a product quantity to be dispensed from the transaction device. In the context of a fuel pump, the transaction amount may be a dollar amount of fuel to purchase, or may be a quantity, such as a number of liters, gallons, or other quantity of fuel. In some cases, the transaction amount may be an instruction to dispense enough fuel to fill a fuel tank. In some embodiments, the selection may be communicated to the transaction device, which may then communicate the selection to the server. In some embodiments, the selection of the transaction amount and/or the transaction device may include a selection of a product type to be dispensed. For example, a fuel grade and/or fuel type may be selected. As another example, where a vending machine is serving as a transaction device, a food, beverage, and/or other product to be dispensed may be selected along with the transaction device and/or transaction amount.

In some embodiments, either prior to, or upon, the transaction authorization, additional authentication measures may be taken. For example, at block 606, location information may be received from the mobile device and the point of sale device. This may be done using networks such as network 508 described above. For example, the mobile application executed on the mobile device may retrieve location information, such as GPS data and/or other location data from the mobile device and provide this location information to the central server over a cellular data network, a Wi-Fi network, and/or other wireless network. In some embodiments, a short range network, such as NFC, Bluetooth™, or other short range wireless network may be used to provide the mobile device's location to the transaction device, which may relay the location information to the central server. The transaction device may communicate its own location to the central server. For example, the transaction device may retrieve its own GPS data, IP address data, and/or other location information, such as location information that is programmed into the transaction device. This location information may be communicated over a public or private network to the central server. The location information from the mobile device may then be compared with the location information from the point of sale device to authenticate the user account at block 608. This ensures that a user of the payment media is the holder of the mobile device since both the payment media and the mobile device must be present to complete the transaction, download the mobile application, and provide identity credentials needed to create the account.

In some embodiments, a determination that the location information from the mobile device does not match the location information from the transaction device may be made at block 610. As an additional authentication measure, one or more challenge questions may be communicated to the mobile application at block 612. These challenge questions may be presented on a display of the mobile device and a user may input answers to the questions. The challenge questions may include questions that verify purchases made using the payment media, information related to an account associated with the mobile device, and/or a combination thereof. A response to the one or more challenge questions may be received from the mobile application at block 614. Based on the received response or responses, a determination made be made at block 616 of whether to authenticate the user account.

At block 618, an authorization request may be received for a payment account associated with the mobile device to an issuer of the payment account. The authorization request may be for a transaction of at least the transaction amount. For example, prior to dispensing a product, the mobile device and/or transaction device may communicate an authorization request to the server to authorize a payment account for the purchase. In some embodiments, the authorization request may be communicated to an issuer of the payment account or other financial institution. The payment account may be stored on and/or otherwise linked to the mobile application, such as by a user account associated with the mobile application. An authorization approval for the transaction may be received from the issuer or other financial institution at block 620. Upon receiving the approval, a command or other signal to activate the transaction device to dispense the product may be sent to the transaction device at block 622. The signal transmission may be directed to the transaction device based on the identifier associated with the transaction device. In the fuel pump example, upon activation, the user may pump an amount of fuel matching the transaction amount. In some embodiments, a notification may be sent indicating that the transaction device has been activated or is otherwise ready for use. For example, a message may be communicated to the mobile device and/or the transaction device that alerts the user that the product may be dispensed. Indications may include written messages on a display of the transaction device and/or mobile device, and/or may include other audio and/or visual indications produced by the transaction device and/or the mobile device. Upon dispensing the transaction amount, the transaction device may be deactivated such that no more product may be dispensed at block 624. A receipt of the transaction may be provided to the mobile device at block 626. For example, a message or notification may be sent to the mobile application and/or and SMS message or email containing a receipt of the purchase may be communicated to the mobile device.

Figure 7:
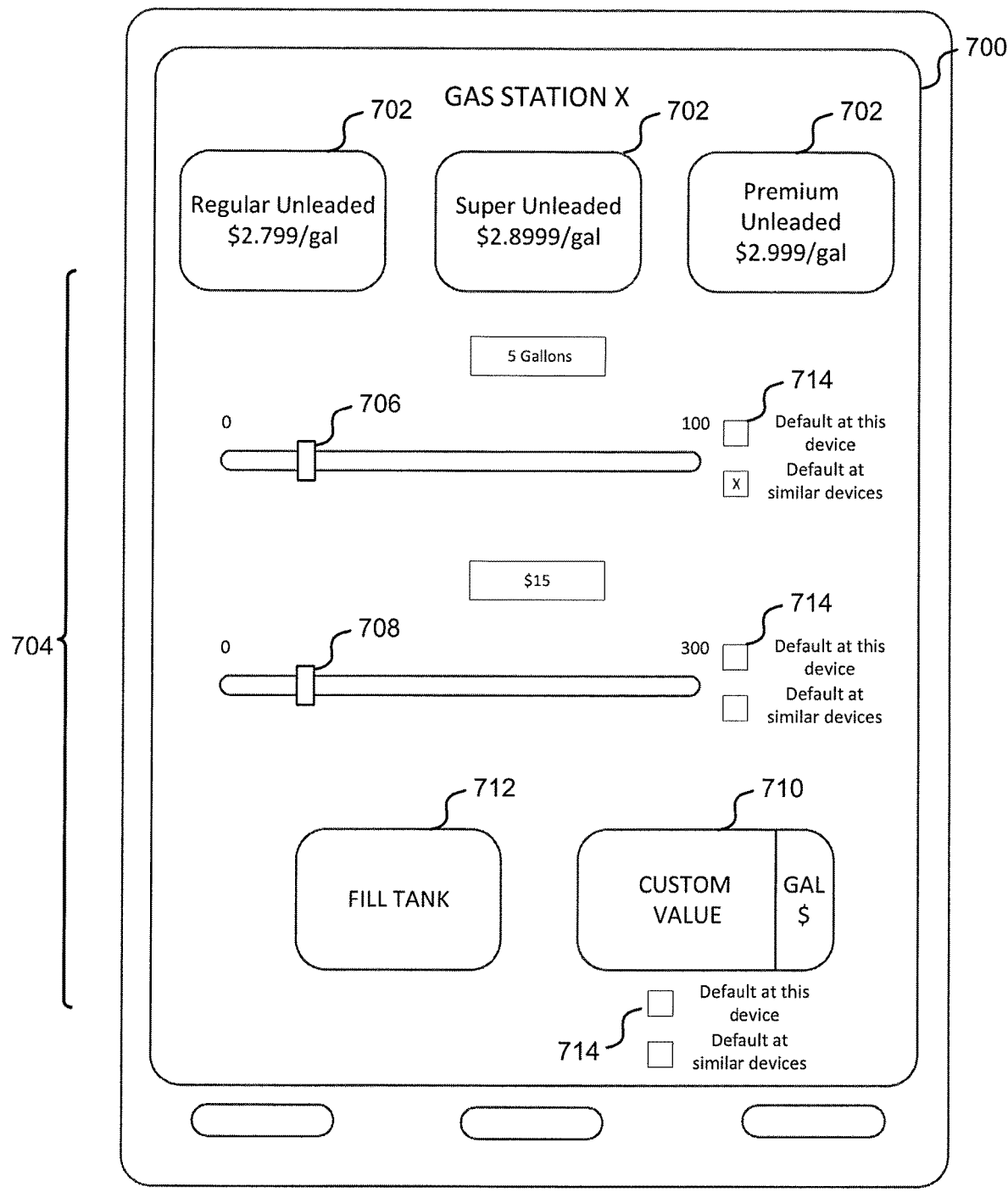
FIG. 7 shows a user interface of a mobile application for remotely activating a transaction device according to embodiments.

FIG. 7 depicts an embodiment of a user interface 700 of a mobile application for selecting a product type and a transaction amount to be dispensed at a transaction device. User interface 700 may include buttons 702 allowing a user to select a particular product type. Labels may be provided on or near each button 702 that indicate a product type and/or a price per unit of each product. For example, for fuel pumps, each button 702 may be associated with a label for a fuel grade and/or a cost per gallon or liter of fuel. User interface 700 may also include a transaction amount selection area 704. Transaction amount selection area 704 may include one or more methods of selecting a transaction amount, such as described above in FIGS. 5 and 6. For example, a slider bar 706 may be provided that allows the user to select a transaction amount in the form of a product quantity. As one example, a user may be able to select a number of gallons of fuel to purchase. A slider bar 708 may be provided that enables a user to select a transaction amount in the form of a dollar or other currency value. For example, slider bar 708 may be used to select a purchase of $20 of fuel. Rather than use a slider to select a transaction amount, the user may enter a value in a custom value field 710. When selected, such as by a user touching a portion of a display of the mobile device associated with custom value field 710, a touchscreen keyboard may be opened such that the user may enter a value. In some embodiments, custom value field 710 may include a selector of units for the custom value, such that the user only needs to input a number and check a box or otherwise select a unit type for the custom value.

In gas station embodiments, a fill button 712 may be provided. By selecting the fill button, a user may set the transaction value as enough fuel to fill the tank. In such embodiments, an authorization request may be submitted to a financial institution for a predetermined amount. Oftentimes this predetermined amount may be an average transition cost and/or a maximum transaction cost. For example, the financial institution and/or merchant may select the predetermined authorization amount, which may be for a value well in excess of the average cost. As one example, a payment account associated with the mobile application may be authorized for a truncation for $250, where the average transaction cost is closer to $30. This ensures that the payment account has sufficient funds to cover all or almost all transaction amounts. Upon filling the tank and deactivating the fuel pump, a final transaction cost may be determined and the purchase transaction may be processed using this value. In embodiments where a user manipulates slider bar 706 and/or slider bar 708 and/or embodiments where a custom value is selected, an authorization request for the exact amount of product may be submitted to a financial institution. In embodiments where a user selects a transaction amount that is greater than the amount of product dispensed, such as where a user selects $20 and only $17 of fuel is needed to fill a tank, the final transaction will be processed based on the amount of product dispensed rather than the requested amount. If a user selects a transaction amount below what is needed to fill a tank, the fuel pump will shut off or otherwise deactivate upon dispensing the selected transaction amount. The user may then have the option to select an additional transaction amount or to complete the transaction.

In some embodiments, a user may have a particular product type and/or transaction value that they want to use repeatedly. One or more default buttons 714 may be provided on user interface 700 that allow a user to designate a particular product type and/or transaction value as a default selection for future transactions. In some embodiments, default buttons 714 may include an option for a default selection at only a specific transaction device and/or at all similar transaction devices that offer the same and/or similar product types.

Figure 8:
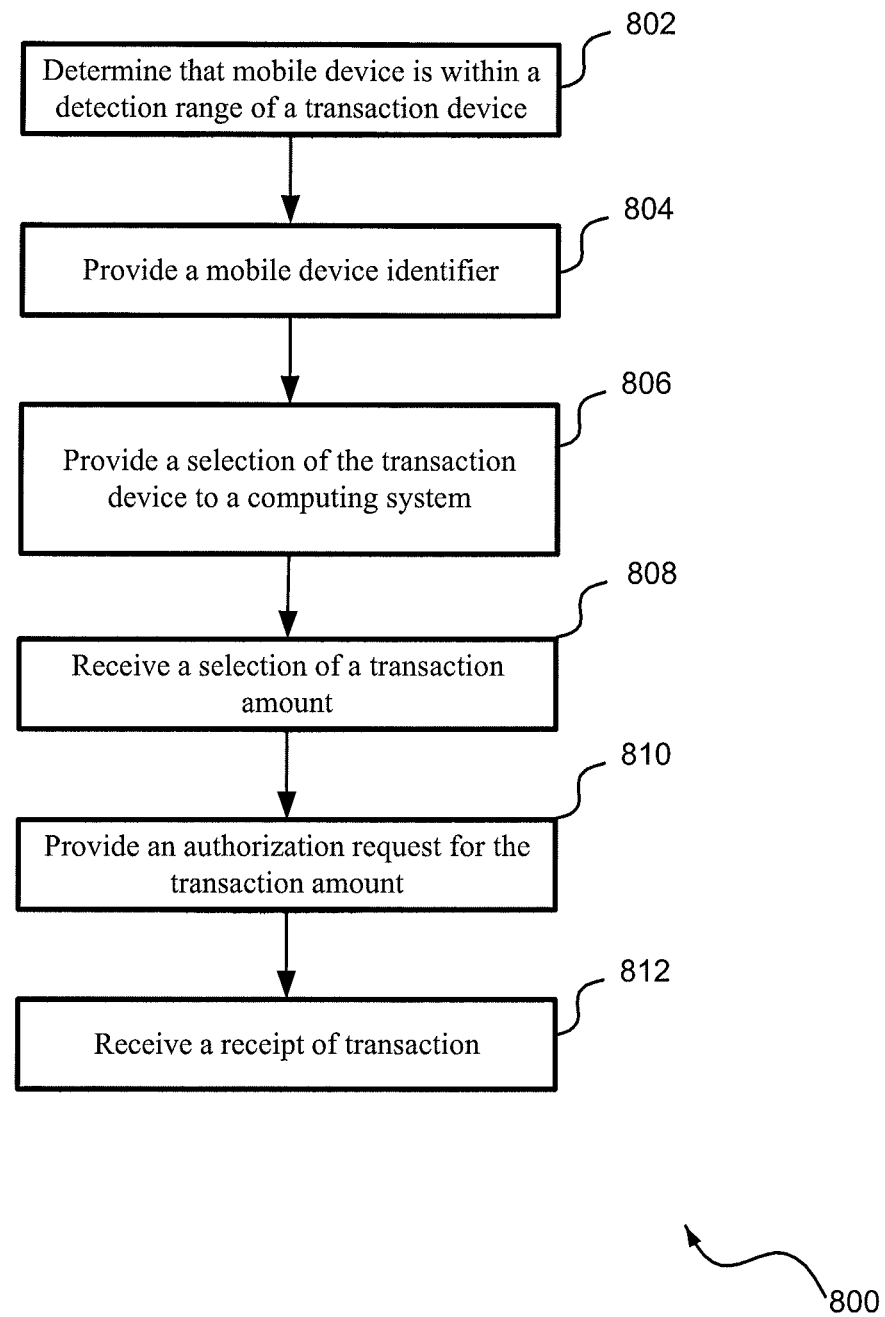
FIG. 8 is a flowchart of a process for remotely activating a transaction device using a mobile device according to embodiments.

FIG. 8 depicts a flowchart of a process 800 for remotely activating a transaction device using a mobile application executed on a mobile device. Process 800 may be performed by mobile applications such as mobile application 200 and may include a user interface such as user interface 700 as described herein. Process 800 may include determining that a mobile device is within a detection range of a transaction device at block 802. This determination may be made by detecting a signal emitted from a transaction device and/or a beacon positioned on or near the transaction device. The signal may include an identifier of the transaction device such that the mobile application can properly identify the particular transaction device. In some embodiments, the detection may involve retrieving location information of the mobile device, such as data from a GPS sensor of the mobile device, and comparing the location information with known locations of transaction devices. When the locations match within a predetermined distance range, the mobile device may determine that it is within the detection range of the transaction device. In some embodiments, upon detecting that the mobile device is within the detection range, the mobile application may automatically open a user interface, such as user interface 700 as described above.

The mobile device may provide a mobile device identifier associated with the mobile device to a computing device, such as server 506, at block 804. The mobile device identifier may be a phone number of the mobile device or an identifier associated with a particular instance of the mobile application such that the server and/or transaction device may properly identify the mobile device and/or any payment information or payment accounts associated with the mobile device. At block 806, a selection of the transaction device may be provided to the computing device. The selection may include an identifier associated with the transaction device such that product selections, transaction amounts, and/or activation commands may be properly directed. The selection of the transaction device may be received at a user interface of the mobile application, such as user interface 700. In some embodiments, the selection of a transaction device may include a user selecting a particular transaction device from a list of nearby and/or other known transaction devices. In other embodiments, the mobile device may detect a signal from a beacon on or near the transaction device. For example, an NFC, RFID, and/or other beacon may emit a signal that includes the identifier of the transaction device. When the mobile device is within a broadcast range of the beacon signal, the identifier may be received by the mobile device for communication to the computing device. In other embodiments, a camera of the mobile device may be used to scan a barcode, QR code, and/or other image that may provide the identifier to the mobile device for transmission to the computing device.

At block 808, a selection of a transaction amount related to a purchase of a product may be received. For example, a user may interact with the user interface to select a dollar amount and/or a product quantity to purchase and/or have dispensed form the transaction device. For example, a position of a slider, such as slider 708 in FIG. 7, may be used to indicate the transaction amount on the user interface. In some embodiments, this selection may include a product type, such as a fuel grade. An authorization request for the transaction amount may be communicated to the computing device at block 810. In embodiments where a user selects a product quantity as the transaction amount, rather than a dollar amount, a price per unit of the product may be used to calculate a dollar value of the transaction amount. The transaction amount and/or dollar amount may be included in an authorization request to a financial institution, such as an issuer of a payment account associated with the mobile application, mobile device, and/or user device thereof. Upon authorization of the transaction amount, the transaction device may be activated by the computing device to dispense the product. In some embodiments, an indication that the transaction device is ready for use may be provided on the transaction device and/or the mobile device. For example, a text-based and/or other visual indication may be produced and/or an audio indication may be emitted from a speaker of the transaction device and/or mobile device. The transaction device may then dispense the product in the authorized amount and a receipt of the purchase may be received by the mobile device upon the product being dispensed at block 812.

Shared Payment in Mobile Transactions

In some embodiments, systems and methods are provided for providing shared payment solutions for mobile transactions. Such shared payment solutions may be especially useful for parents who want their children to be able to make specific purchases, such as fuel or food purchases, but do not want their children to have their own credit cards. Systems and methods may provide the ability of a primary user that is verified for mobile transactions and is enrolled in the mobile transaction system to add additional participants to download and use the mobile application to pay for goods and services using the primary user's payment account. The primary user may have the ability to invite secondary users to link to the payment account. The primary user may also have the ability, using a mobile application such as mobile application 200, to provide account restrictions pertaining to what goods, services, may be purchased by the secondary user, the dollar value threshold that may be spent, the dates or duration for when the secondary user may make purchases, and/or other restrictions. Additionally, the primary user may have the ability to deactivate the secondary account at any time. Notifications regarding purchase and use details of the secondary user may be sent to the primary user, such as SMS messages, push notifications, emails, phone calls, and/or other computer and/or telephonic generated methods.

As one example, a primary user may set up and/or select a payment account to share. The primary user may then select one or more secondary users to add to the payment account. The payment account may be linked to the secondary users. The secondary users may then be notified of the addition. For secondary users who already have the mobile application, the notification may be a push notification or other application specific notification. The notification may also be via SMS message, email, or other electronic message. Such notifications are particularly useful for secondary users who do not have the mobile application. For secondary users that do not yet have the mobile application, the notification may include instructions to download the mobile application and/or may include a method of providing access to a download for the mobile application. Upon downloading the mobile application, the secondary user may complete an authentication process and/or register with the mobile application. The secondary users may then use the payment account to complete transactions using the mobile application.

Figure 9:
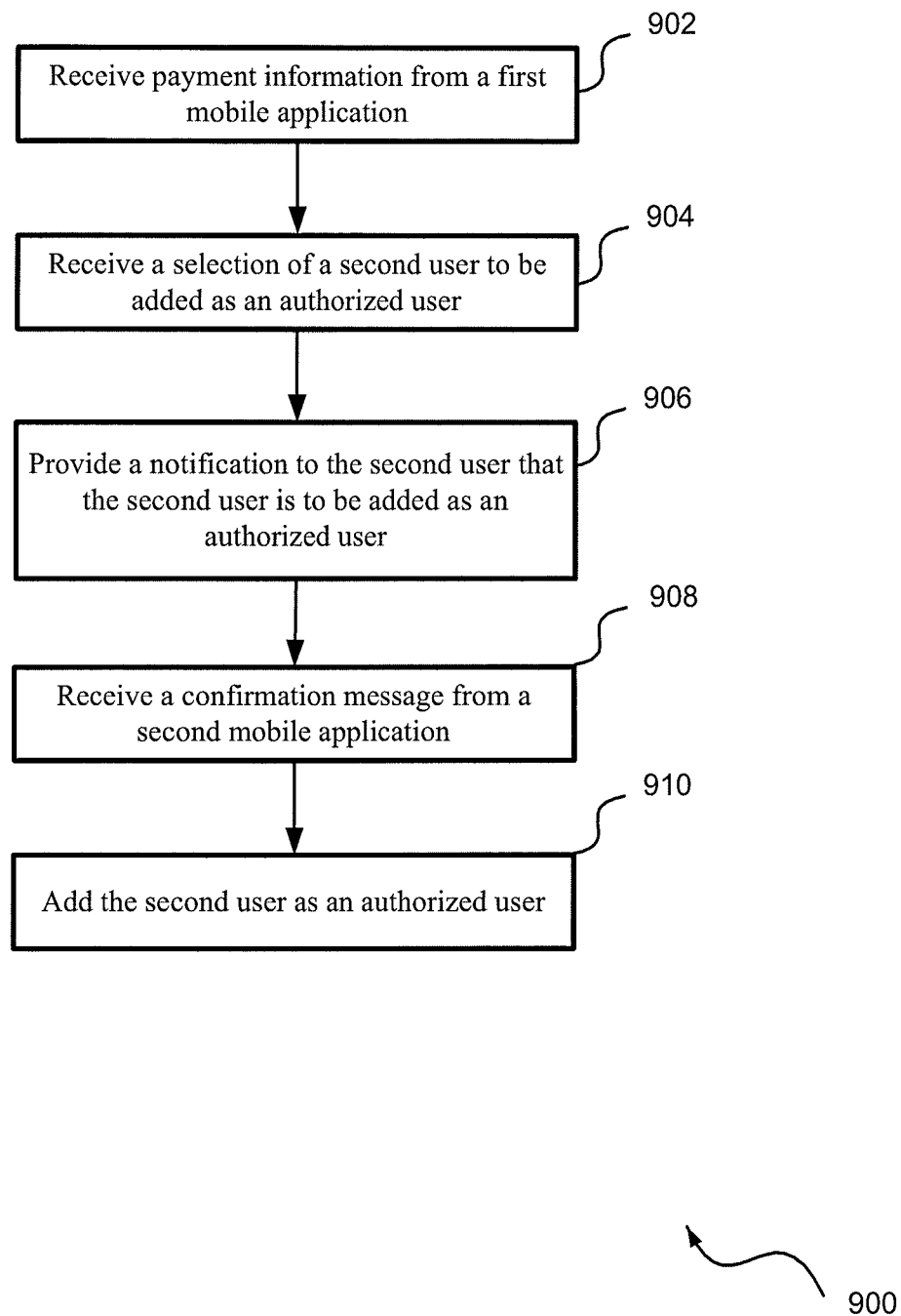
FIG. 9 is a flowchart of a process for setting up a shared payment according to embodiments.

FIG. 9 depicts a process 900 for setting up a shared payment account for conducting mobile transactions. Process 900 may be performed by a server or other computing device that is in contact with two or more mobile devices over one or more networks. Process 900 may begin with receiving payment information from a primary user's mobile application executed on a primary user's mobile device at block 902. The payment information may be associated with a payment account of the verified primary user. In some embodiments, the payment account may be previously established and/or verified for use with the primary user's mobile application and/or account associated therewith for prior use by the primary user in conducting mobile transactions. At block 904, a selection of a secondary user to be added as an authorized user of the payment account may be received from the primary user's mobile application. The secondary user may be associated with a user identifier, such as a phone number, email address, and/or a username associated with a mobile application of the secondary user. The primary user may select the secondary user by inputting the user identifier into the primary user's mobile application. In some embodiments, a list of possible secondary users may be displayed to the primary user. For example, the list may be populated with the primary user's phone and/or email contact list.

Along with the selection of the secondary user, the primary user may provide restrictions on the use of the payment account. Each secondary user may have his own set of restrictions supplied by the primary user. Restrictions may determine what products and/or services the payment account may be used to purchase. Additionally, spending limits may be provided. The spending limits may be in terms of a number of purchases, a number of a specific type of purchase, a dollar amount, and/or other spending limit. For example, a primary user may allow a secondary user to fill up a fuel tank once a week, purchase lunch every day, and/or spend $50 per week using the payment account. The restrictions may also determine when and where a secondary user may utilize the payment account. For example, only transactions at a particular merchant may be authorized and/or transactions during a specific time of day, such as at lunch, may authorized.

Upon receiving the selection of a secondary user, a notification may be provided to the secondary user that the secondary user has been added by the verified primary user as an authorized user of the payment account at block 906. The notification may be directed to the second user using the user identifier. For example, if the secondary user already has the mobile transaction mobile application, the notification may be a push notification and/or other "in-app" notification that uses an identifier associated with the secondary user's mobile application alerting the secondary user of the selection. In other embodiments, the notification may be directed to the secondary user by SMS, email, or other non-app-based format. In embodiments where the secondary user does not already have the mobile transaction mobile application downloaded on their mobile device, the notification may include instructions on how to download the mobile application and/or may provide direct access to the download. For example, access to the download may be provided in the form of a link to the download. In some embodiments, a command may be sent to the secondary user's mobile device such that the secondary use's mobile device navigates to a download source, such as a website using the mobile device's browser and/or a mobile application database. The user may then download and install the mobile application.

At block 908 a confirmation message may be received from the secondary user's mobile application. The confirmation message may serve as an acceptance by the secondary user to be added as an authorized user on the payment account, and the confirmation may include authentication information associated with the second user. For example, the authentication information may include a mobile device and/or user account username, password, and/or biometric input to verify that the secondary user in possession of the secondary mobile device is who the primary user believes them to be. Additionally, the authentication information may include information related to other authentication methods, such as those described elsewhere herein. Upon authentication, the secondary user may be added as an authorized user of the payment account at block 910, and may use the payment account to complete mobile transactions within any restrictions set by the primary user. In some embodiments, while the secondary user may use the payment account for mobile transactions, the payment account details and/or other payment information of the primary user may be hidden from the secondary user. This allows the secondary user to utilize the payment account within any restrictions set by the primary user without any risk of the secondary user being able to use the payment account and/or other payment information outside of the shared payment using the mobile application.

Another aspect of shared payment systems and methods is the ability of a user to request funds for a specific purchase. A first registered user of a first instance of the mobile application may select, using the mobile application, a second registered user of a second instance of the mobile application from which to request funds. The second user may receive a notification related to the request for funds and select, using the mobile application, whether to approve or deny the request. Upon approval, a payment account associated with the second user's mobile application may be used to conduct the transaction.

As one example, a first user may select a contact, or second user, from within a mobile transaction mobile application. The first user may then send a request for a transaction amount, such as a dollar amount and/or a product quantity. For example, the first user may request payment for five gallons of fuel to a gas station. A notification may be sent to the second user that funds in the transaction amount have been requested by the first user. The second user may accept or deny the request using a mobile application on their mobile device. Upon acceptance, the first user may have the ability to conduct the purchase transaction in real-time or near real-time. In some embodiments, the first user may be required to authenticate, such as by providing identify credentials, prior to completing the transaction. This may ensure that the first user is actually the person the second user believes them to be, reducing the likelihood of fraudulent funds requests. Identity credentials may include a username, a password, a biometric identifier and/or other indication information. Upon completion of the transaction, the second user may receive a receipt of the transaction completed by the first user.

Figure 10:
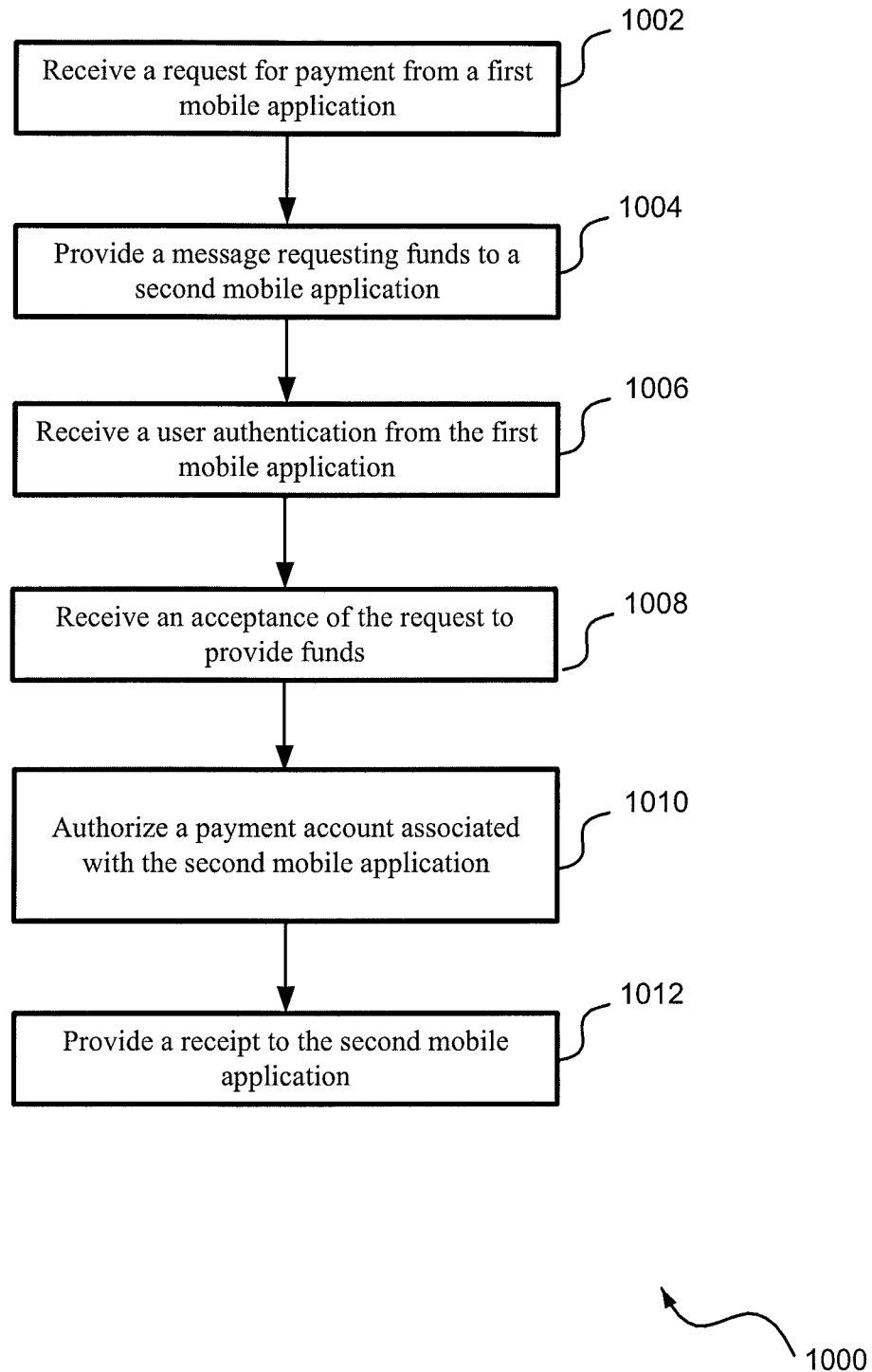
FIG. 10 is a flowchart of a process for requesting funds for a transaction from another user according to embodiments.

FIG. 10 depicts a flowchart of one embodiment of a process 1000 for requesting funds from another user. Process 1000 may be performed by a server or other computing device that is in contact with two or more mobile devices over one or more networks. Process 1000 may begin with receiving a request for a payment from a first mobile application executed by a first mobile device at block 1002. The request may include a transaction amount and a user identifier associated with a second user account and a second mobile device. The transaction amount may include a product quantity and/or a dollar value of a purchase. For a request to purchase fuel, a number of gallons or liters of fuel may be included and/or a dollar value of gas may be requested as the transaction amount. In some embodiments, a request to fill a fuel tank may also be received. The selection of a transaction amount may be done using a user interface of a mobile application, such as user interface 700 as described herein. The user identifier may be a phone number, email address, and/or a username associated with the mobile application and/or second user account.

At block 1004, a message may be communicated to the second mobile device using the user identifier to direct the message. The message may include a request to provide funds for the transaction amount. The message may also provide a name or other identifier of the first user such that the second user knows who is requesting the funds. A user authentication may be received from the first mobile application at block 1006 to verify an identity of a user of the first mobile device. This ensures that the user requesting the funds is the person who the second user believes them to be. The authentication may be received at any point of the request process, such as before or while providing a selection of the transaction amount, while in other embodiments, the authentication may be done after the second user approves the payment, or anytime there between.

An acceptance of the request to provide funds may be received from a second mobile application being executed by the second mobile device at block 1008. In some embodiments, the acceptance may include a counteroffer. For example, the second user may be willing to provide some funds to the first user, but not the amount requested. The second user may then select a transaction amount value that he is willing to pay for. A payment account associated with the second user account may be authorized for the payment such that the first mobile device may complete a related payment transaction in real-time at block 1010. For example, an authorization request may be communicated to a financial institution associated with the payment account requesting authorization of a transaction in a dollar amount of the transaction amount. The financial institution may approve or deny the transaction and send the approval or rejection to the server. Upon completion of the transaction, a receipt of the payment transaction may be sent to the second mobile device at block 1012.

In some embodiments, the request may be for funds to make a purchase at a transaction machine, such as those described herein. In such embodiments, the process 1000 may also include activating a transaction device to dispense a quantity of a product matching the transaction amount and deactivating the transaction device upon dispensing the transaction amount.

Mobile Application Service Scheduler

In some embodiments, systems and methods of scheduling vehicle service using a mobile application are provided. Users are provided the ability to manually or through electronic means, schedule or directly purchase services and/or parts for their vehicle. Users may also have the ability to purchase fuel and/or other products to be picked up at a merchant and/or service provider. Additionally, the system may send the user a mobile notification when a service to the vehicle is due, and may provide a scheduling interface to help the user schedule, price, and/or pay for any necessary and/or desired services.

In one example, an odometer reading of a vehicle may be provided to a mobile application. This helps alert the application when scheduled service is due on specific vehicle systems, such as oil changes, tire rotations, and brake pad replacements. The mobile application may be interfaced with a telematics interface of the vehicle to get automatic updates of statuses of various vehicle systems. Service notifications may be set within the mobile application such that when a certain date, odometer reading, and/or status of a system monitored by the telematics interface occurs, a service notification is provided to the user, such as an SMS, email, push notification and/or other in-app notification. Additionally, the mobile application may provide the user the ability to purchase other goods and services from the merchant and/or service provider. For example, a user may interact with a menu of available products and/or services available from a particular merchant on a user interface of the mobile application to place an order. The user may pay for the goods and/or services and provide a time for fulfillment of the order. For example, the user may order food or drink from a merchant and request that it be available at a designated time such that the user may pick up the goods upon arrival at the merchant. The user may prepay using the application so they merely have to pick up the goods.

Figure 11:
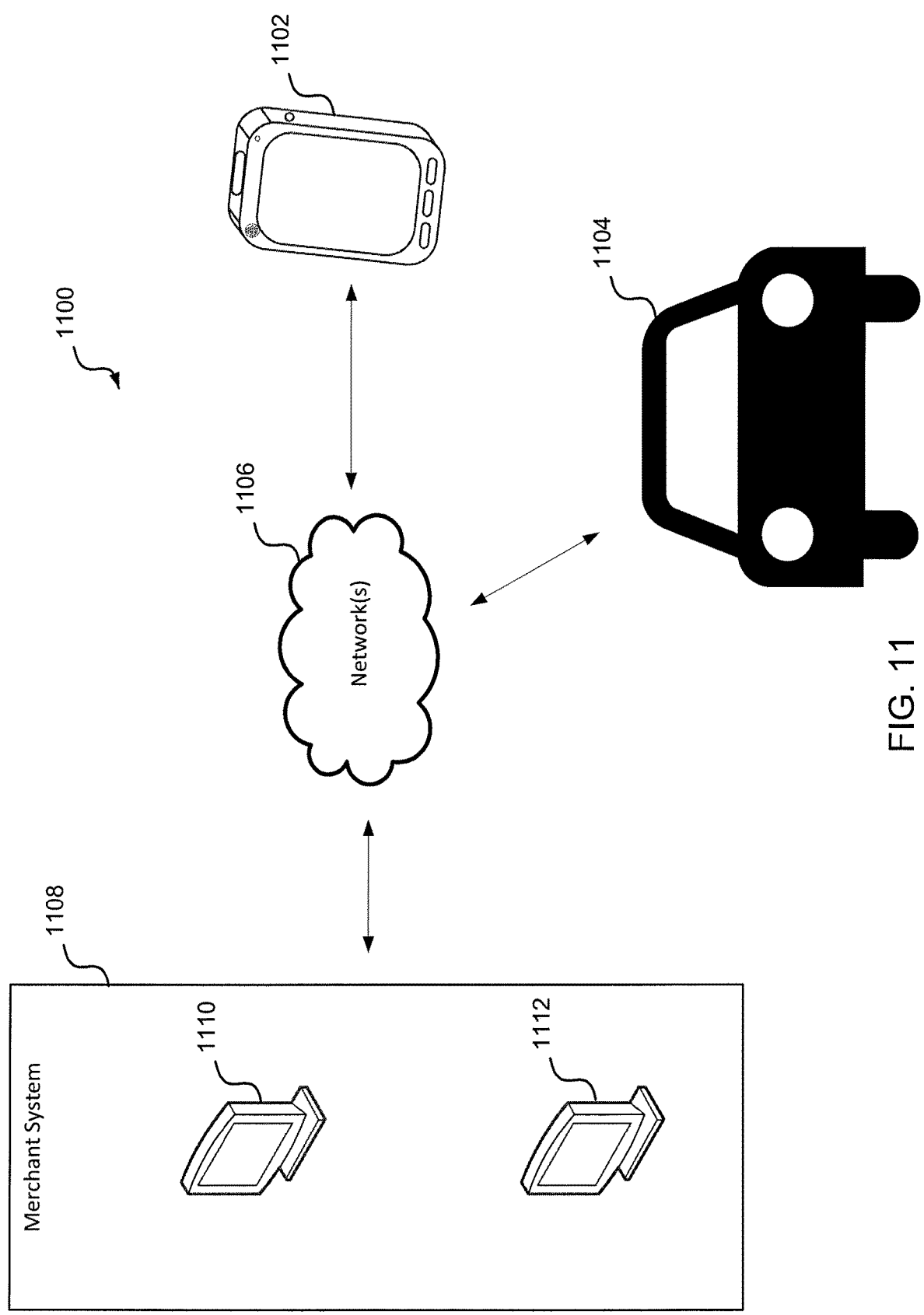
FIG. 11 is a system diagram showing a system for scheduling vehicle service using a mobile application according to embodiments.

FIG. 11 depicts a system 1100 for scheduling vehicle service using a mobile application. System 1100 may include a mobile device 1102 that executes a mobile application for scheduling vehicle service. Mobile device 1102 may interface with various components of a vehicle 1104, such as by communicating with a telematics interface of vehicle 1104 using a network 1106. Network 1106 may be a local area network (LAN) and/or other private or public wired and/or wireless networks. Network 1106 may utilize one or more of Wi-Fi, ZigBee, Bluetooth™, Bluetooth™ Low Energy, a cellular communications protocol such as 3G, 4G, or LTE, and/or any other wireless communications protocol. Network 1106 may be communicatively coupled with one or more of the components of the system to facilitate communication between the various components. It will be appreciated that one or more different network connections may be used in accordance with the invention, and that the use of a single network 1106 to enable communications is merely one example of such configurations. For example, each component may be communicatively coupled with other components using a separate network for one or more of the connections. Oftentimes, a connection between mobile device 1102 and vehicle 1104 may be a Bluetooth™ or similar short range network.

By interfacing with the telematics interface of vehicle 1104, mobile device 1102 and/or a mobile application may retrieve data regarding various systems of the vehicle. For example, odometer readings, tire pressures, brake pad condition, fluid levels, and the like may be provided to the mobile device such that service reminders and notifications may be set and provided to the user. The mobile device 1102 may communicate with a merchant system 1108 to schedule service appointments and/or to order products and/or services. For example, the mobile device 1102 may request a schedule of available appointments from a service computer 1110 of the merchant system 1108. This schedule may be provided to the user of the mobile device 1102 such that the user may select a convenient time for the service appointment. The user may also pay for any service using the mobile application running on the mobile device 1102.

Additionally, the mobile application may be used to purchase additional services and/or products using the mobile device 1102. For example, a user may wish to purchase food from the merchant or service provider while the vehicle is being serviced. The mobile device 1102 may interface with a merchant computer 1112 of the merchant system 1108 to retrieve a menu of available services and/or goods. The user may then use the mobile application to select a product, such as food, for purchase. The user may then pick up the food upon his arrival at the service appointment. Such ordering may be useful in any situation where quicker transactions are desired, such as when wanting to purchase convenience store items while fueling up a vehicle.

Figure 12:
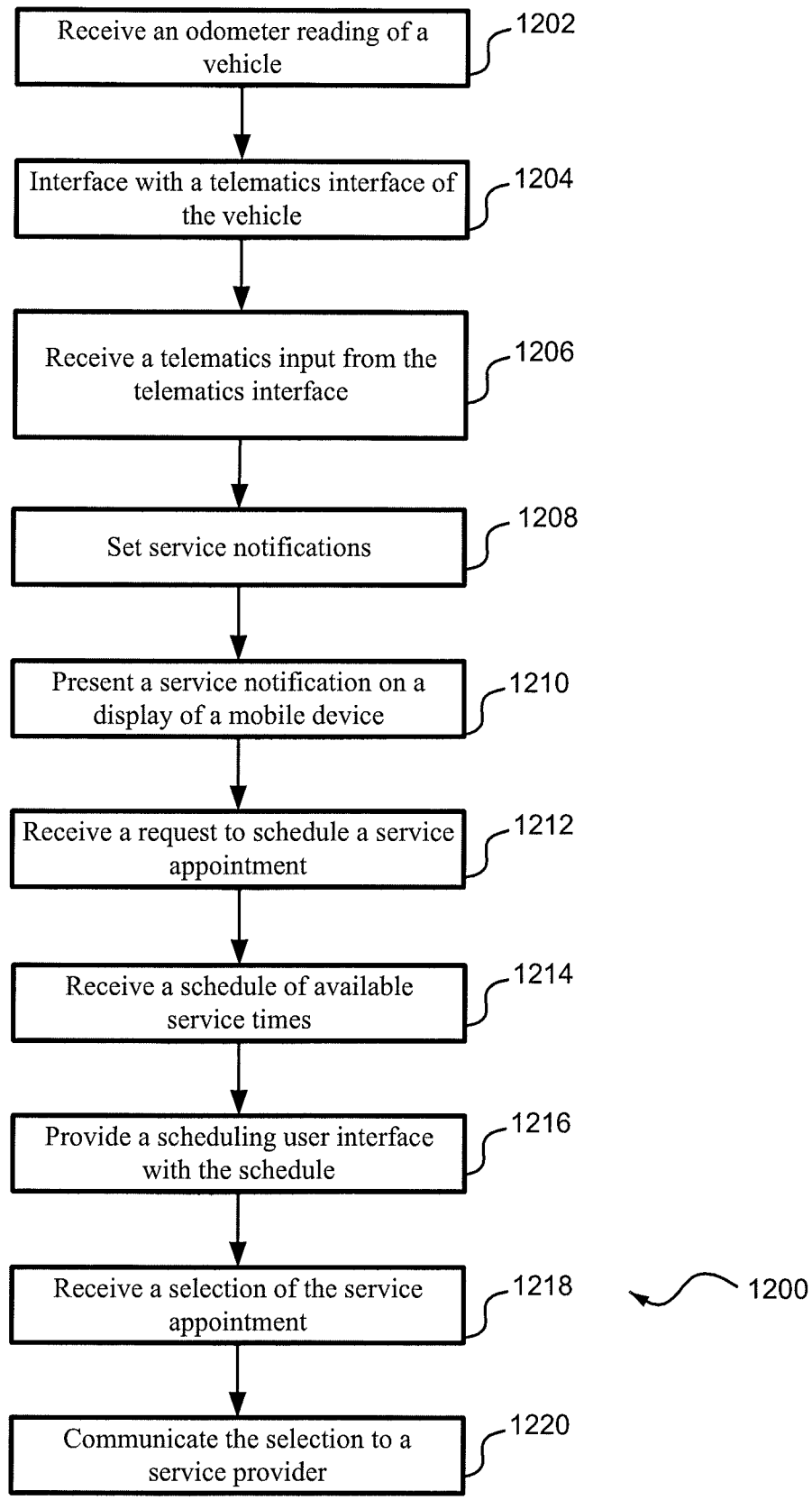
FIG. 12 is a flowchart of a process for scheduling vehicle service using a mobile application according to embodiments.

FIG. 12 depicts a flowchart of a process 1200 for conducting mobile transactions using a mobile application. Process 1200 may be performed by a mobile device, such as mobile device 1102, that is executing a mobile application, such as those described herein. Process 1200 may begin with receiving an odometer reading of a vehicle at block 1202. The odometer reading may be manually input by a user of the mobile device and/or may be received by communicatively coupling the mobile device to the vehicle. For example, the mobile device may be interfaced with a telematics interface of the vehicle at block 1204. A telematics input may be received from the telematics interface at block 1206. The telematics input may include status of one or more systems of the vehicle. For example, the telematics input may include odometer readings, tire pressures, brake pad condition, fluid levels, and/or statuses of other vehicle systems and components. In some embodiments, the telematics input may include one or more service codes of the vehicle. The service codes may indicate that a particular service or other maintenance is needed. One or more service notifications may be set based on the odometer reading and the telematics input at block 1208. For example, dates and/or mileages may be set for oil change reminders, tire rotations, tire replacements, brake pad replacements, and/or other services.

At least one of the one or more service notifications may be presented on a display of the mobile device executing the mobile application at block 1210. For example, a push notification, other in-app notification, SMS message, email, and/or other notification may be presented on the mobile device to alert the user that one or more services should be scheduled. The user may interact with the mobile application to request to schedule a service appointment related to the at least one of the one or more service notifications at block 1212. Upon receiving the request to schedule a service appointment, the mobile device may request a schedule of available service times from a service provider, such as an auto shop. The mobile device may receive the schedule of available service times from the service provider at block 1214.

At block 1216, the mobile device and/or mobile application may provide a scheduling user interface that includes the schedule of available service times on the display of the mobile device. This allows a user to view available times, estimated costs, and/or other details associated with the requested service. A selection of the service appointment may be received at block 1218. The selection may include at least one of the available service times, although in some embodiments, multiple service times may be selected in case a first time is no longer available. This selection may be communicated to the service provider at block 1220. In some embodiments, a confirmation of the service appointment may be received from the merchant or service provider. This confirmation may be an SMS, email, push notification, and/or other in app notification directed to the mobile application and/or mobile device. The confirmation may be presented on a display of the mobile device such that the user knows that the appointment scheduling was successful.

In some embodiments, a menu user interface may be provided to the mobile device and displayed such that the user may view a menu of products or services available for purchase from the service provider. For example, food or car washes may be purchased using the mobile application. An order may be received as a user selects one or more of the products and/or services to order. Along with the products and/or services, the order may contain a selected time to fulfill the order. For example, the user may wish to pick up the purchase at a particular time, such as when the user plans on visiting the merchant, plans on fueling up a vehicle, and/or plans on bringing the vehicle in for service. The user may also provide payment for the selected products and/or services at the time of ordering using the mobile application. The order and/or fulfillment time may be communicated to the service provider for fulfillment of the order.

Fraud Prevention and Authentication

Systems and methods are provided for verifying users who are registering payment accounts, completing payment transactions with registered payment accounts, requesting and/or approving funds from a registered payment account, and/or conducting other transactions using the mobile transaction systems described herein. The verification methods may reduce fraud associated with enrolling and/or utilizing a payment account with a mobile transaction mobile application. Several different verification and/or fraud detection techniques may be utilized, such as in the processes described herein, many of which verify that an owner of the payment account matches the owner of a mobile device and/or user account associated with a mobile application running on the mobile device.

As one example, during registration of a credit card with a mobile application, magnetic data from the credit card is collected using a POS device. The user then enters a phone number associated with his mobile device into the POS device, which may cause a message to be sent to the mobile device such that a mobile application may be downloaded and installed on the user device and a user account may be created and associated with the credit card account. Location information from the mobile device may be compared with a location of the POS device two ensure the user is in possession of both the credit card and the mobile device. Additionally, user information may be retrieved from a carrier or service provider of the mobile device, which may be compared with user information associated with the credit card to determine whether the credit card and mobile device are jointly owned.

In some embodiments, upon registration or use of a credit card or other payment media associated with a payment account, a financial institution that issued and/or maintains the payment account may be queried to determine whether the payment media has been lost or stolen and/or whether the payment account has been otherwise compromised.

In some embodiments, challenge questions may be provided on a mobile device to ensure that the user of the payment account is authorized to use the payment account. For example, challenge questions related to a previous use or transaction of the payment account may be presented on the mobile device. The user may then select a correct answer or otherwise indicate a correct answer, to verify that the user is authorized to conduct transactions using the payment account. As one example, challenge questions may ask a user to select a recent transaction made using the payment account from a list of possible transactions that includes the recent transaction, as well as one or more dummy transactions. In some embodiments, multiple challenge questions may be asked to decrease the likelihood that a person could correctly guess the correct transaction. Such challenge questions may be utilized as a standalone verification measure and/or as a secondary verification measure, such as when a primary verification measure determines that the mobile device user and the credit card user are not one in the same.

It will be appreciated that these and/or other authentication techniques, such as biometric authentication and/or a user entering a device PIN on the device associated with a particular user, may be applied alone, or in combination, to authenticate users of mobile transaction mobile applications. Other authentication techniques may include identifying the mobile device using mobile device data available to the mobile app, identifying the user using user registration data such as a name, email id, password, and/or phone number supplied by the user, and/or by checking against a device blacklist kept by FDC and/or by phone carriers. For example, these lists may include data related to velocity checking of enrollments for that device. If a user has a particularly high number of enrollments in a short period, it may indicate that the device has been stolen and is being used improperly. Additional authentication techniques may also include checking the user against a user registration data blacklist kept by FDC. In embodiments where multiple authentication techniques are utilized, a weighted score of the authentication technique used may be calculated. A final authentication decision for the transaction may then be made based on this weighted score.

Figure 13:
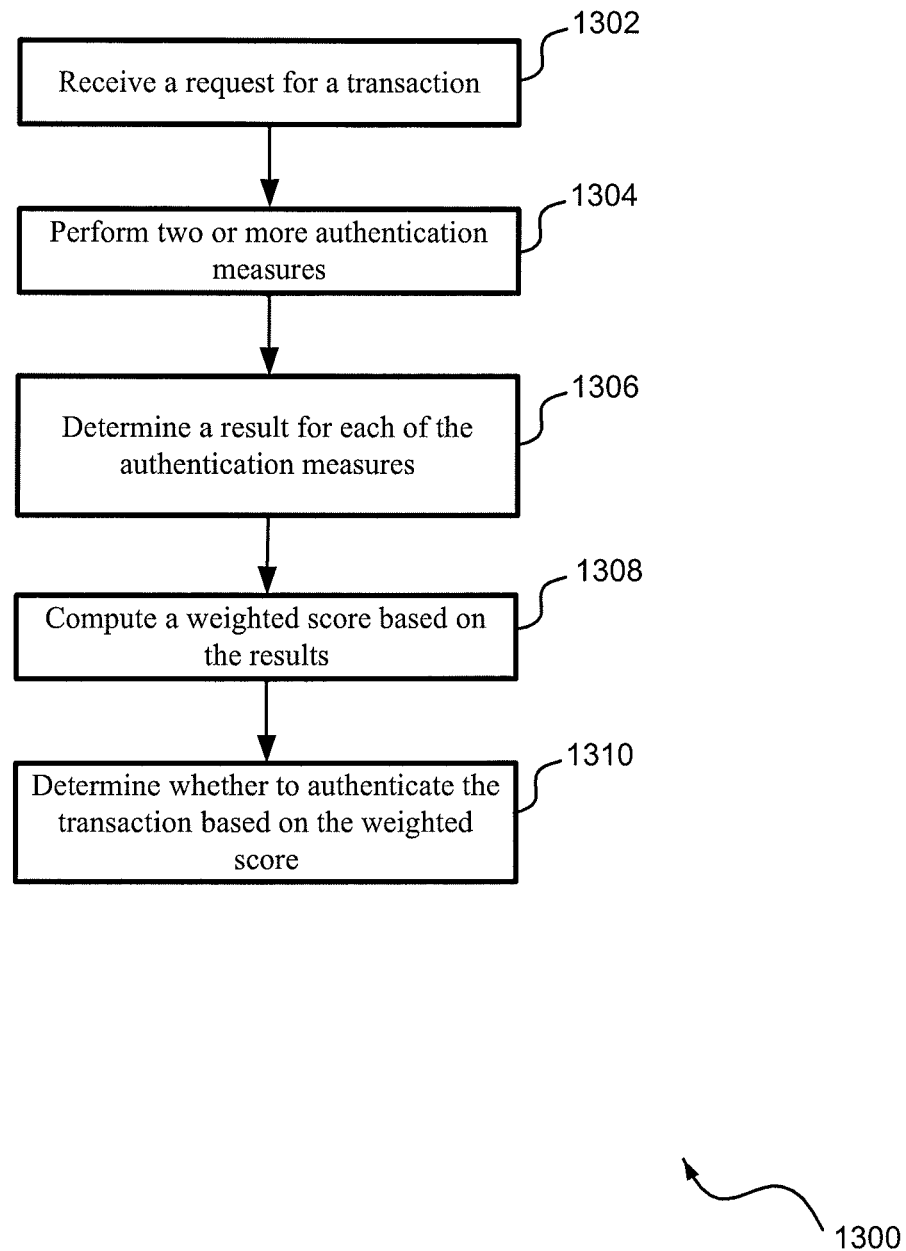
FIG. 13 is a flowchart of a process for fraud prevention and authentication according to embodiments.

FIG. 13 depicts a flowchart of a process 1300 for fraud prevention and authentication. Process 1300 may be performed by a computing device, such as a server, POS device, and/or transaction device. Process 1300 may begin by receiving a request for a transaction at block 1302. The transaction may be a request for funds, a request for approval of a transaction, a response to a notification to add an authorized user on a payment account, other authorizations described herein, and/or any enrollment and/or transaction authorization. At block 1304, two or more authentication measures may be performed.

Any form of authorization measures may be performed, such as biometric authentication. Other examples of authorization measures may include receiving location information from the mobile device and the transaction device and comparing the location information from the mobile device with the location information from the transaction device to authenticate the transaction, such as is described above. In some embodiments, a determination that the location information from the mobile device does not match the location information from the transaction device may be made. One or more challenge questions may be communicated to the mobile application, and a response to the one or more challenge questions may be received from the mobile application.

In some embodiments, the authentication measures may include receiving mobile device account information associated with the mobile device from a carrier network provider of the mobile device. The mobile device account information may include first user identity information. Payment account information associated with the payment account may be received. The payment account information may include second user identity information. The first user identity information may be compared with the second user identity information to authenticate the transaction.

The authentication measures may include comparing a mobile device identifier against a mobile device list of a first third-party system. For example, the mobile device identifier may be compared against a blacklist and/or whitelist maintained by a phone carrier or other information system. Velocity checking of enrollments in different transaction systems of a mobile device associated with the mobile device identifier may be made, as excessive enrollment of a mobile device in accounts may be an indication of fraud. User information of a user of the mobile device may be against a user registration data list of a second third-party system, such as an information system. A password or biometric input received at the mobile device may be compared with a registered password to authenticate a user and/or device. Similarly, payment account data may be compared against a payment account list of a third third-party system, such as an information system, issuer of the payment account, and/or other financial institution.

In some embodiments, the authentication measures may include identifying a mobile device based on mobile device data available to a mobile application executed on the mobile device. For example, the mobile device may be able to retrieve information from a device carrier or other system. A user may be identified based on user registration device received by the mobile device. This information may be compared to information stored on the mobile device, received by a wireless carrier, financial institution, and/or other third-party source. A payment account may be identified based on payment account data received by the mobile device. This data may be verified against information received from a financial system or other third-party service.

Upon completion of each authentication measure, a result for each of the two or more authentication measures may be received at block 1306. Based on the results of the two or more authentication measures, a weighted scored may be calculated at block 1308. A determination whether to authenticate the transaction based at least in part on the weighted score may be made at block 1310.

Figure 14:
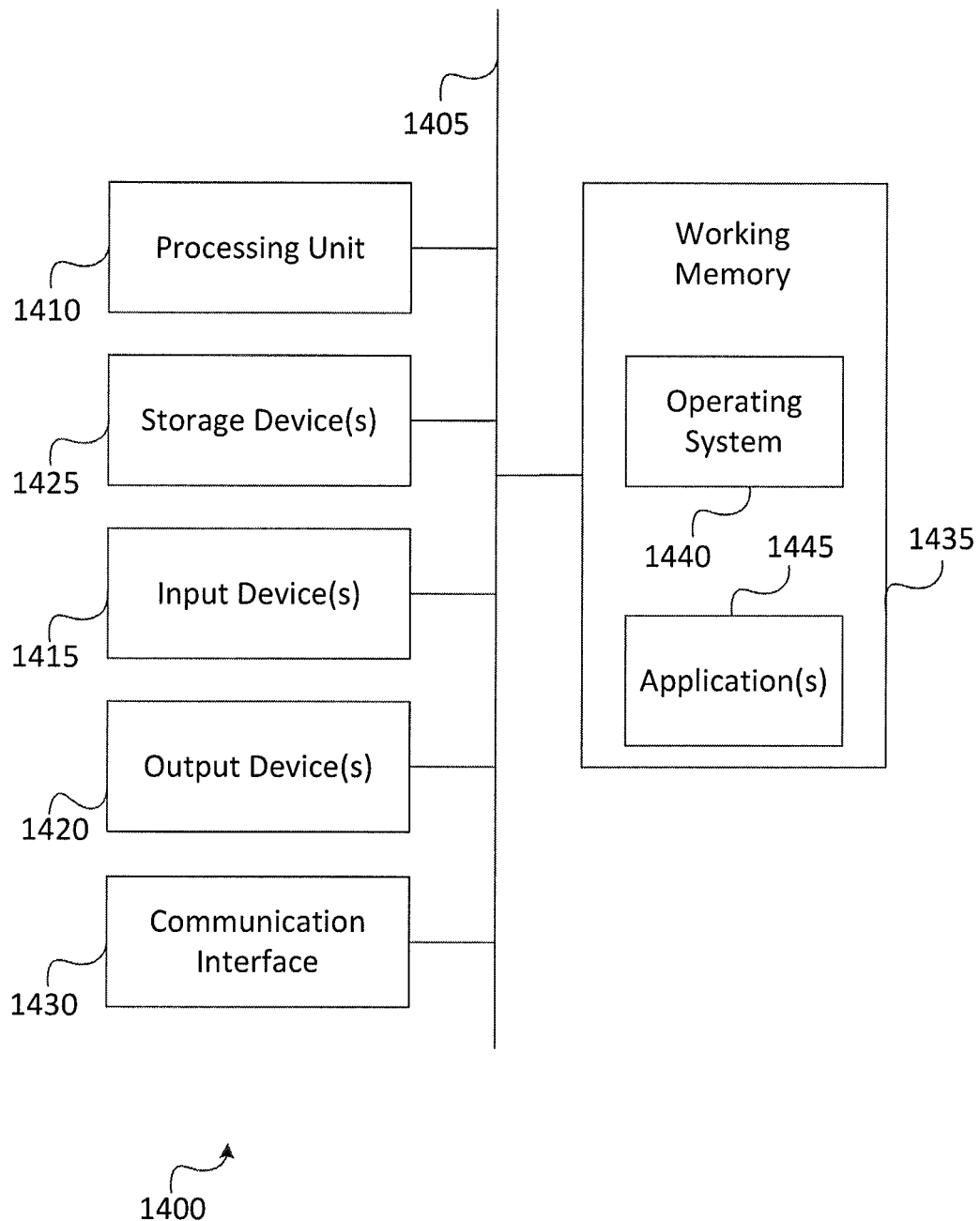
FIG. 14 is a block diagram of an example computing system according to embodiments.

A computer system as illustrated in FIG. 14 may be incorporated as part of the previously described computerized devices. For example, computer system 1400 can represent some of the components of the mobile devices, servers, merchant systems, telematics systems, financial institution systems, POS devices and/or transaction devices as described herein. FIG. 14 provides a schematic illustration of one embodiment of a computer system 1400 that can perform the methods provided by various other embodiments, as described herein, and/or can function as the host computer system, a server, a remote kiosk/terminal, a ticket vending machine or other point-of-sale device, a transaction device, a fuel pump, a mobile device, and/or a computer system. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include a processing unit 1410, including without limitation one or more general-purpose processors and/or one or more special-purpose processors (such as digital signal processing chips, graphics acceleration processors, and/or the like); one or more input devices 1415, which can include without limitation a mouse, a keyboard, a touchscreen, receiver, a motion sensor, a camera, a smartcard reader, a contactless media reader, and/or the like; and one or more output devices 1430, which can include without limitation a display device, a speaker, a printer, a writing module, and/or the like.

The computer system 1400 may further include (and/or be in communication with) one or more non-transitory storage devices 1435, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communication interface 1430, which can include without limitation a modem, a network card (wireless or wired), an infrared communication device, a wireless communication device and/or chipset (such as a Bluetooth™ device, an 503.11 device, a Wi-Fi device, a WiMax device, an NFC device, cellular communication facilities, etc.), and/or similar communication interfaces. The communication interface 1430 may permit data to be exchanged with a network (such as the network described below, to name one example), other computer systems, and/or any other devices described herein. In many embodiments, the computer system 1400 will further comprise a non-transitory working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1435 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1410, applications 1445, etc.) Further, connection to other computing devices such as network input/output devices may be employed.

Some embodiments may employ a computer system (such as the computer system 1400) to perform methods in accordance with the disclosure. For example, some or all of the procedures of the described methods may be performed by the computer system 1400 in response to processing unit 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1435. Merely by way of example, execution of the sequences of instructions contained in the working memory 1435 might cause the processing unit 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processing unit 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1435. Volatile media include, without limitation, dynamic memory, such as the working memory 1435. Transmission media include, without limitation, coaxial cables, copper wire and fiber optics, including the wires that comprise the bus 1405, as well as the various components of the communication interface 1430 (and/or the media by which the communication interface 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a non-transitory storage device 1435 either before or after execution by the processing unit 1410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. It will be understood that embodiments disclosed in above may include more or less features, depending on desired functionality. A process may have additional steps not included in the figure. The processes and systems described herein may be combined in part and/or in whole with one another in some embodiments. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method of remotely activating a transaction device, the method comprising:
    enrolling, by a computing system, a mobile device for use in mobile transactions, wherein enrolling the mobile device comprises:
    receiving, by the computing system from the mobile device, a mobile device identifier associated with the mobile device;
    receiving, by the computing system from the mobile device and subsequent to enrolling the mobile device, the mobile device identifier;
    receiving, by the computing system from the mobile device, an identification of a transaction device, the identification comprising an identifier associated with the transaction device;
    receiving, by the computing system from the transaction device, an authorization request associated with a payment account for a transaction at the transaction device;
    receiving, by the computing system, location information from the mobile device and location information from the transaction device in response to receiving the authorization request;
    comparing, by the computing system, the location information from the mobile device with the location information from the transaction device to determine whether the mobile device is in proximity to the transaction device;
    determining, by the computing system an authorization status of the authorization request based at least in part on the determination of whether the mobile device is in proximity to the transaction device; and
    transmitting, by the computing system, a signal to activate the transaction device to complete the transaction, wherein the signal is transmitted based on the identifier associated with the transaction device.

2. The method of remotely activating a transaction device of claim 1, further comprising:
    transmitting, by the computing system to the transaction device, a deactivation instruction to deactivate the transaction device upon dispensing a product associated with the transaction; and
    providing, by the computing system, a receipt of the transaction to the mobile device.

3. The method of remotely activating a transaction device of claim 1, further comprising:
    receiving, at the computing system from the mobile device, an indication of a transaction amount related to a purchase of a product associated with the transaction, wherein the authorization request comprises a purchase amount based at least part on the transaction amount.

4. The method of remotely activating a transaction device of claim 3, wherein:
    the transaction amount comprises one or more of a dollar amount or a quantity of the product to be dispensed.

5. The method of remotely activating a transaction device of claim 1, wherein:
    receiving the identification of the transaction device further comprises receiving a selection of a product to be dispensed.

6. The method of remotely activating a transaction device of claim 1, wherein:
    the transaction device comprises a fuel pump; and
    the method further comprises sending, by the computing system, a notification to the mobile device that the fuel pump is ready for use.

7. The method of remotely activating a transaction device of claim 6, wherein:
    receiving the identification of the transaction device further comprises receiving a selection of a fuel grade.

8. The method of remotely activating a transaction device of claim 1, further comprising:
    determining, by the computing system, that the location information from the mobile device does not correspond to the location information from the transaction device;
    communicating, by the computing system to the mobile device and responsive to determining that the location information from the mobile device does not correspond to the location information from the transaction device, one or more challenge questions; and
    receiving, by the computing system from the mobile device, a response to the one or more challenge questions wherein the authorization status is determined based at least in part on the response.

9. The method of remotely activating a transaction device of claim 1, wherein:
    enrolling the mobile device further comprises:
    receiving, by the computing system from a carrier network provider of the mobile device, first user identity information associated with a user of the mobile device;
    receiving, by the computing system from a financial institution, payment account information associated with a payment account and second user identity information associated with a user of the payment account;
    comparing, by the computing system, the first user identity information with the second user identity information to verify that the user of the mobile device and the user of the payment account are the same; and
    storing the first user identity information and the second user identity information.

10. The method of remotely activating a transaction device of claim 1, wherein:
    the signal causes the transaction device to dispense a product associated with the transaction.

11. A computing system for remotely activating a transaction device, comprising:

at least one processor; and a memory having instructions stored thereon that, when executed by the at least one processor, cause the computing system to:

enroll a mobile device for use in mobile transactions, wherein enrolling the mobile device comprises:

receiving, from the mobile device, a mobile device identifier associated with the mobile device;

receiving, from the mobile device and subsequent to enrolling the mobile device, the mobile device identifier;

receiving, from the mobile device, an identification of a transaction device, the identification comprising an identifier associated with the transaction device;

receiving, from the transaction device, an authorization request associated with a payment account for a transaction at the transaction device;

receiving, location information from the mobile device and location information from the transaction device in response to receiving the authorization request;

comparing the location information from the mobile device with the location information from the transaction device to determine whether the mobile device is in proximity to the transaction device;

determining an authorization status of the authorization request based at least in part on the determination of whether the mobile device is in proximity to the transaction device; and sending, a signal to activate the transaction device to complete the transaction, wherein the signal is transmitted based on the identifier associated with the transaction device.

12. The computing system for remotely activating a transaction device of claim 11, wherein:

enrolling the mobile device further comprises:

receiving from a point of sale device of a merchant payment information associated with one or more payment accounts, including the payment account, and originating from a use of the one or more payment accounts at the point of sale device during one or more purchase transactions;

storing the payment information; and associating the mobile device identifier with the payment information.

13. The computing system for remotely activating a transaction device of claim 12, wherein:

enrolling the mobile device further comprises:

sending a communication to the mobile device, the communication providing access to a download for a mobile application associated with the merchant.

14. The computing system for remotely activating a transaction device of claim 11, wherein:

the signal causes the transaction device to dispense a product associated with the transaction.

15. The computing system for remotely activating a transaction device of claim 11, wherein:

the instructions to determine the authorization status cause the computing system to:

transmit, to an issuer of the payment account, the authorization request for the payment account; and receive, an authorization approval for the transaction from the issuer.

16. The computing system for remotely activating a transaction device of claim 11, wherein:

enrolling the mobile device further comprises:

receiving, from a carrier network provider of the mobile device, first user identity information associated with a user of the mobile device;

receiving, from a financial institution, payment account information associated with a payment account and second user identity information associated with a user of the payment account;

comparing the first user identity information with the second user identity information to verify that the user of the mobile device and the user of the payment account are the same; and storing the first user identity information and the second user identity information.

17. The computing system for remotely activating a transaction device of claim 16, wherein:

enrolling the mobile device further comprises:

receiving authentication credentials comprising a user identifier and password from a mobile application being executed on the mobile device; and creating a user account associated with the mobile device identifier, payment information, the authentication credentials, and one or both of the first user identity information and the second user identity information.

18. A computer program product embodied on a non-transitory computer readable medium comprising instructions, that when executed by one or more processors, cause the one or more processors to:

enroll, by a computing system, a mobile device for use in mobile transactions, wherein enrolling the mobile device comprises:

receiving, by the computing system from the mobile device, a mobile device identifier associated with the mobile device;

receive, from the mobile device and subsequent to enrolling the mobile device, the mobile device identifier;

receive, by the computing system, an identification of a transaction device from the mobile device, the identification comprising an identifier associated with the transaction device;

receive, by the computing system from the transaction device, an authorization request associated with the a payment account for a transaction at the transaction device;

receive, by the computing system, location information from the mobile device and location information from the transaction device in response to receiving the authorization request;

compare, by the computing system, the location information from the mobile device with the location information from the transaction device to determine whether the mobile device is in proximity to the transaction device;

determine, by the computing system, an authorization status of the authorization request based at least in part on the determination of whether the mobile device is in proximity to the transaction device; and send, by the computing system, a signal to activate the transaction device to complete the transaction, wherein the signal is transmitted based on the identifier associated with the transaction device.

19. The computer program product of claim 18, wherein:

the signal causes the transaction device to dispense a product associated with the transaction.

20. The computer program product of claim 18, wherein the instructions further cause the one or more processors to:

transmit, by the computing system to the transaction device, a deactivation instruction to deactivate the transaction device upon dispensing a product associated with the transaction.

21. The computer program product of claim 18, wherein:

receiving the identification of the transaction device further comprises receiving a selection of a product to be dispensed.

22. The computer program product of claim 18, wherein the instructions further cause the one or more processors to:

determine, by the computing system, that the location information from the mobile device does not match the location information from the transaction device;

communicate, by the computing system to the mobile device and responsive to determining that the location information from the mobile device does not correspond to the location information from the transaction device, one or more challenge questions;

receive, by the computing system from the mobile device, a response to the one or more challenge questions; and authenticate, by the computing system, the transaction based on the response.

23. The computer program product of claim 18, wherein: enrolling the mobile device comprises:

receiving, from a carrier network provider of the mobile device, first user identity information associated with a user of the mobile device;

receiving, from a financial institution, payment account information associated with a payment account and second user identity information associated with a user of the payment account;

comparing the first user identity information with the second user identity information to verify that the user of the mobile device and the user of the payment account are the same; and storing the first user identity information and the second user identity information.

24. The computer program product of claim 23, wherein: enrolling the mobile device further comprises:

receiving authentication credentials comprising a user identifier and password from a mobile application being executed on the mobile device; and creating a user account associated with the mobile device identifier, the payment account information, the authentication credentials, and one or both of the first user identity information and the second user identity information.

\* \* \* \* \*